United States Patent
Maruyama et al.

(10) Patent No.: US 7,496,446 B2
(45) Date of Patent: Feb. 24, 2009

(54) DRIVING SUPPORT SYSTEM AND DRIVING SUPPORT METHOD WITH INFORMATION DISPLAYED ON A VEHICLE'S WINDSHIELD

(75) Inventors: Yasunori Maruyama, Yokosuka (JP); Takuo Ishiwaka, Yokohama (JP); Koichi Kuroda, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 590 days.

(21) Appl. No.: 11/147,336

(22) Filed: Jun. 8, 2005

(65) Prior Publication Data

US 2005/0278113 A1    Dec. 15, 2005

(30) Foreign Application Priority Data

Jun. 11, 2004  (JP)  ............ P2004-173937
Apr. 11, 2005  (JP)  ............ P2005-113418

(51) Int. Cl.
*G01C 21/30* (2006.01)
*G01C 21/32* (2006.01)

(52) U.S. Cl. ............ 701/208; 701/201; 701/200; 340/995.1; 340/995.28

(58) Field of Classification Search ............ 701/200, 701/207–208, 201; 340/990, 995.1, 995.25
See application file for complete search history.

(56) References Cited

U.S. PATENT DOCUMENTS

2002/0059017 A1    5/2002 Yamane et al.

2003/0130780 A1    7/2003 Shiimado et al.

FOREIGN PATENT DOCUMENTS

EP    0 833 291 A1    4/1998
EP    0 869 300 A1    10/1998

(Continued)

OTHER PUBLICATIONS

Artificial vision in road vehicles; Bertozzi, M.; Broggi, A.; Cellario, M.; Fascioli, A.; Lombardi, P.; Porta, M.; Proceedings of the IEEE; vol. 90, Issue 7, Jul. 2002 pp. 1258-1271; Digital Object Identifier 10.1109/JPROC.2002.801444.*

(Continued)

*Primary Examiner*—Cuong H Nguyen
(74) *Attorney, Agent, or Firm*—McDermott Will & Emery LLP

(57) ABSTRACT

A driving support system including: a vehicle location detector which detects current location and velocity vector of a vehicle; a traffic and road information database which stores point information of points on a route of the vehicle; a point information acquisition unit which acquires, from the database, the point information of the approaching points located in a given distance from the vehicle current location, based on the detected vehicle current location and velocity vector; a display device which provides displays of the acquired point information on a horizontally long screen thereof along a windshield of the vehicle; and a display control unit for controlling the display device. The display control unit determines display positions on the screen to display the point information, based on a positional relationship between the current location of the vehicle and the points where the point information related thereto are displayed.

19 Claims, 21 Drawing Sheets

FOREIGN PATENT DOCUMENTS

| JP | 62245158 A | * | 10/1987 |
|---|---|---|---|
| JP | 01054215 A | * | 3/1989 |
| JP | 09-034352 | | 2/1997 |
| JP | 09-189565 | | 7/1997 |
| JP | 2001-301639 | | 10/2001 |
| JP | 2002-255040 | | 9/2002 |
| JP | 2003-246227 | | 9/2003 |

OTHER PUBLICATIONS

Autonomous cross-country navigation: an integrated perception and planning system; Olin, K.E.; Tseng, D.Y.; IEEE Expert [see also IEEE Intelligent Systems and Their Applications]; vol. 6, Issue 4, Aug. 1991 pp. 16-30; Digital Object Identifier 10.1109/64.85918.*

Vehicle control by computer vision; Manigel, J.; Leonhard, W.; Industrial Electronics, IEEE Transactions on; vol. 39, Issue 3, Jun. 1992 pp. 181-188; Digital Object Identifier 10.1109/41.141618.*

Synthetic Vision—a view in the fog; Burgess, M.A.; Hayes, R.D.; Aerospace and Electronic Systems Magazine, IEEE; vol. 8, Issue 3, Mar. 1993 pp. 6-13; Digital Object Identifier 10.1109/62.199814.*

Fusion of fixation and odometry for vehicle navigation; Adam, A.; Rivlin, E.; Rotstein, H.; Systems, Man and Cybernetics, Part A, IEEE Transactions on; vol. 29, Issue 6, Nov. 1999 pp. 593-603; Digital Object Identifier 10.1109/3468.798063.*

A real-time laser-based detection system for measurement of delineations of moving vehicles; Cheng, H.H.; Shaw, B.D.; Palen, J.; Larson, J.E.; Xudong Hu; Van katwyk, K.; Mechatronics, IEEE/ASME Transactions on; vol. 6, Issue 2, Jun. 2001 pp. 170-187; Digital Object Identifier 10.1109/3516.928732.*

A compact integrated visual motion sensor for ITS applications; Yamada, K.; Soga, M.; Intelligent Transportation Systems, IEEE Transactions on; vol. 4, Issue 1, Mar. 2003 pp. 35-42; Digital Object Identifier 10.1109/TITS.2002.808418.*

An experimental performance evaluation of a novel radio-transmitter identification system under diverse environmental conditions; Tekbas, O.H.; Serinken, N.; Ureten, O.; Electrical and Computer Engineering, Canadian Journal of; vol. 29, Issue 3, Jul. 2004 pp. 203-209; Digital Object Identifier 10.1109/CJECE.2004.1532524.*

* cited by examiner

| POINT | POSITION COORDINATE | ADVISORY SPEED | INFORMATION PRIORITY | ICON |
|---|---|---|---|---|
| P1 | (X1,Y1) | 50km/h | MIDDLE | ↰ |
| P2 | (X2,Y2) | 40km/h | MIDDLE | ↱ |
| P3 | (X3,Y3) | 35km/h | HIGH | ↰ |

ADVISORY SPEED 30km/h — P3
ADVISORY SPEED 30km/h — P2
P1
ADVISORY SPEED 40km/h
HOST VEHICLE CURRENT POSITION G

DRIVING SUPPORT SYSTEM AND DRIVING SUPPORT METHOD WITH INFORMATION DISPLAYED ON A VEHICLE'S WINDSHIELD

BACKGROUND OF THE INVENTION

1. Field of Invention

The present invention relates to a driving support system and a driving support method that allow a display device to display information related to points on a route of a vehicle for thereby supporting a driver.

2. Description of Related Art

In the growing field of vehicle based intelligent system technologies, there have been efforts to develop systems to support drivers' operations, one of which is a driving support system to acquire information related to points on a route, such as curve points, and to provide the acquired information to the driver by displaying it on an on-vehicle display.

Japanese Patent Application Laid-open Publication No. 9-189565 discloses a technology to have information on the route, such as a curve direction, a curvature, a curve length and a gradient angle of curve points located thereon, displayed on a liquid crystal display of a navigation system, using coordinates data of map information utilized in the navigation system.

Japanese Patent Application Laid-open Publication No. 9-34352 discloses a head-up display device for car navigation, which provides a display of a guiding figure superimposed on a view of a road at a passing point, and when a distance to the passing point is large, the guiding figure is temporarily enlarged in accordance with the magnification set by the distance.

SUMMARY OF THE INVENTION

However, in the above-mentioned systems, the information related to the points on the route are displayed on a predetermined area of the display device with no provision of the display associated with directions in which the points are actually located. Therefore, the driver's view through a windshield cannot be coordinated with the information displayed on the display device, resulting in a difficulty for the driver to intuitively and quickly recognize the information.

The present invention has been made in the light of the problem. It is an object of the present invention is to provide a driving support system and a driving support method which presents information related to points on a route of a vehicle to the driver in a manner that the driver can intuitively and quickly recognize the information coordinated with a driver's view through a windshield, thereby supporting the driver's operation.

An aspect of the present invention is a driving support system comprising: a vehicle location detector which detects current location and velocity vector of a vehicle; a traffic and road information database which stores at least point information related to points on a route of the vehicle; a point information acquisition unit which acquires, from the traffic and road information database, the point information of the points on the route of the vehicle, which are located in a given distance from the current location of the vehicle and to which the vehicle is approaching, based on the current location and velocity vector of the vehicle detected by the vehicle location detector; a display device having a horizontally long screen in a lower area of a driver's view during driving when looking ahead through a windshield of the vehicle, which provides on the screen thereof displays of the point information acquired by the point information acquisition unit; and a display control unit for controlling the display device, wherein the display control unit determines display positions on the screen of the display device to display the point information, based on a positional relationship between the current location of the vehicle and the points where the point information related thereto are displayed.

Another aspect of the present invention is a driving support method for providing a driver with information related to points on a route, comprising: detecting a current location and velocity vector of a vehicle; acquiring point information related to points on a route of the vehicle, which are located in a given distance from a current location of the vehicle and to which the vehicle is approaching, based on the detected current location and velocity vector of the vehicle; and displaying the acquired point information on a horizontally long screen of a display device, disposed in a lower area of a driver's view during driving when looking ahead through a windshield of the vehicle, wherein display positions of the point information on the screen of the display device are determined based on a positional relationship between the current location of the vehicle and the points where the point information related thereto are displayed, while image sizes of the point information to be displayed are determined based on distances from the current location of the vehicle to the points where the point information related thereto are displayed.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
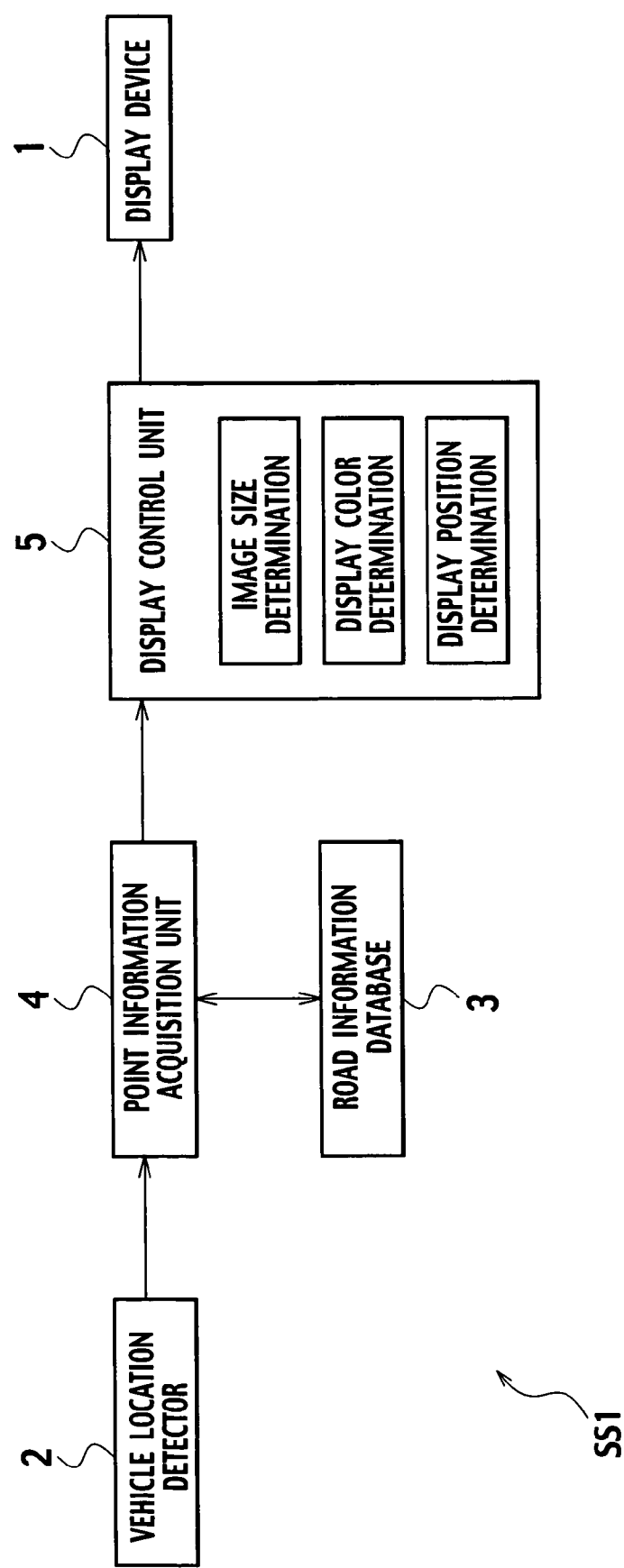
FIG. 1 is a block diagram showing configuration of a driving support system according to a first embodiment of the present invention.

Embodiments of the present invention will be explained below with reference to the drawings, wherein like members are designated by like reference characters.

First Embodiment

FIG. 1 is a block diagram showing configuration of a driving support system SS1 according to a first embodiment of the present invention. The driving support system SS1 is installed on a vehicle (with a vehicle installed with the present system being referred to as a host vehicle) to allow a display device 1 to display point information related to a point on a route of the vehicle for thereby supporting a driver thereof, and includes, in addition to the display device 1, a vehicle location detector 2, a traffic and road information database 3, a point information acquisition unit 4, and a display control unit 5.

The display device 1 is comprised of a display unit, such as a liquid crystal display, which has a horizontally long screen located at a lower area of a windshield. The display device 1 provides a display of point information related to the point on the route, in a pattern coordinated with a driver's view during driving when looking ahead through a windshield under control of the display control unit 5.

As for the display device 1, a variety of display devices may be applied, each of which is able to ensure a display area Da in a horizontally long shape along the windshield. In addition to the liquid crystal display device, an organic EL (electroluminescence) panel and a HUD (Heads Up Display) may be listed up.

The vehicle location detector 2 serves to detect a current location G (in latitude and longitude) and a velocity vector (speed and direction) Gv of the host vehicle A using a GPS (Global Positioning System) and an autonomous sensor. As for the vehicle location detector 2, those in a generally used on-vehicle navigation system can be utilized to find the current location G and the velocity vector Gv of the host vehicle A on a real time basis (to update information for each 5 Hz) during running.

Figures 2, 3:
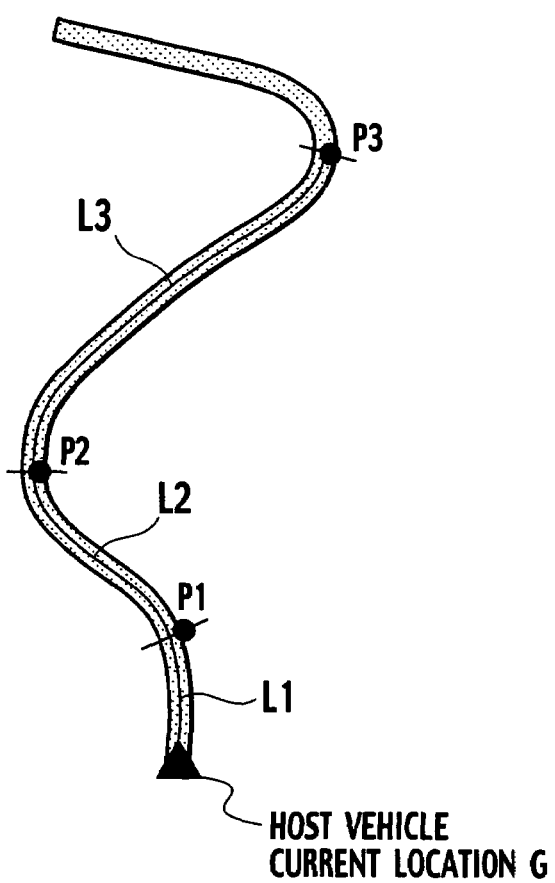
FIG. 2 is a view showing one example of a data structure of point information contained in road information.
FIG. 3 explains how to calculate a drive distance from a current location of a vehicle to a point where the point information related thereto is to be displayed.

The traffic and road information data base 3 serves to store road information including road shape information indicative of a road shape, and point information that forms information specific for each latitude and longitude. Of this road information, road shape information is a set of vector data representing road shape with points (nodes and interpolation points) and line segments (links), and each node and interpolation point are provided within formation on the latitude and longitude thereof and road curvature information R as attribute data thereof. Each link is provided with a road category, a road width and basic advisory speed information of a road represented by the link as attribute data. Further, as shown in FIG. 2, point information has the form of a structured data associated with information on the latitude and longitude indicative of a location coordinates on the relevant point Pn provided by information (a curvature and slope angle of the relevant point, an advisory speed when passing the relevant point, a speed limit, a surface resistance, a presence or absence of an impedimenta, a road construction and a traffic accident, and a tail end of a traffic jam) specific to each point Pn. Point information on each point Pn is provided with information such as a typical icon representing a priority of the relevant information and related point. Also, FIG. 2 shows an example of point information related to points P1, P2, P3 forming curve points, respectively, in which advisory speed information are exemplarily indicated as information specific for respective points.

Road information including road shape information and point information is provided, using map data generally used in the on-vehicle navigation system, to be stored in the traffic and road information database 3. The traffic and road information database 3 does not always have to be installed on the host vehicle A, and may be realized on an information providing server located in a remote place accessible using a communication device, such as a portable phone, a wireless LAN and a DSRC (Dedicated Short Range Communication), so as to allow the information providing server to be accessed from the host vehicle A for acquiring road information.

The point information acquisition unit 4 serves to execute map matching operation with the road information stored in the traffic and road information database 3, based on the current location G and the velocity vector Gv of the host vehicle A detected by the vehicle location detector 2, thereby specifying a location of the host vehicle A on a road, and acquiring road shape information of the road within a given distance LR from the current location of the host vehicle A and point information related to the point Pn located within the given distance LR from the current location of the host vehicle A. Here, the given distance LR may be set to a distance available to obtain a number of point information optimum for driving operation or to a fixed value (of 500 m, for example) determined upon preliminary experiments, or to a value varying depending on the road category and running speed of the host vehicle A.

The display control unit 5 serves to control the display device 1 in a way to display point information, acquired by the point information acquisition unit, on a horizontally long screen Sc of the display device 1 disposed in the lower area of the windshield, in the pattern coordinated with the driver's view through the windshield, and has a function to determine a image size Iwn of the point information, a function to determine a display color of the point information and a function to determine a display position to display point information.

More particularly, the display control unit 5 calculates the distance Ln (the distances L1, L2, L3 from the points P1, P2, P3 in an example shown in FIG. 3) from the points Pn where the point information related thereto are displayed (hereinafter referred to as display points Pn), to the current location G of the host vehicle A as shown in FIG. 3. Although a drive distance to the display point Pn along the route calculated based on road shape information acquired by the point information acquisition unit 4 is herein described as an example of distance Ln from the current location G of the host vehicle A to the relevant point Pn, an alternative may be a linear distance between the current location G of the host vehicle A and the relevant point Pn.

Upon calculation of the drive distance Ln from the current location G of the host vehicle A to the relevant point Pn, the display control unit 5 determines an image size (a width or a surface area) Iwn for the point information, such that the closer the point Pn of the displayed point information is to the current location G of the host vehicle A, the larger will be the image size of the point information to be displayed on the screen Sc of the display device 1. In cases where the image size Iwn determined herein is less than a given value, it is hard for the driver to check what is displayed even if point information such as the advisory speed is displayed. In such a case, it is determined to display only the representative icon.

Further, the display control unit 5 determines display colors of relevant point information, such as red color for point information with a high priority Ipn, yellow color for point information with a middle priority and blue color for point information with a low priority, depending on the information priority Ipn of point information related to the relevant point Pn. This color-coding may also be applied to display contents per se or contours of frames surrounding the respective display contents.

Furthermore, if the displayed point information includes the advisory speed for passing the relevant point, the display control unit 5 may be configured to calculate a deceleration α at which the host vehicle A is required to have its running speed decelerated to the advisory speed Vc for the display point Pn before the host vehicle A reaches the relevant point Pn, based on a current running speed Vi of the host vehicle A and the distance Ln to the relevant point Pn. The information priority Ipn may be determined in three levels such as high, middle and low priorities depending on the required deceleration α. Depending on the information priority Ipn based on the required deceleration α, the operation may be executed to calculate a display color for point information related to the point Pn. Here, the required deceleration α may be calculated in a formula α=(Vi+Vi−Vc×Vc)/Ln. In cases where the display color of point information is thus determined based on the information priority Ipn which is determined based on the required deceleration α, it becomes possible to determine the display color of point information based on priorities meeting the needs of practical drives.

Figure 5:
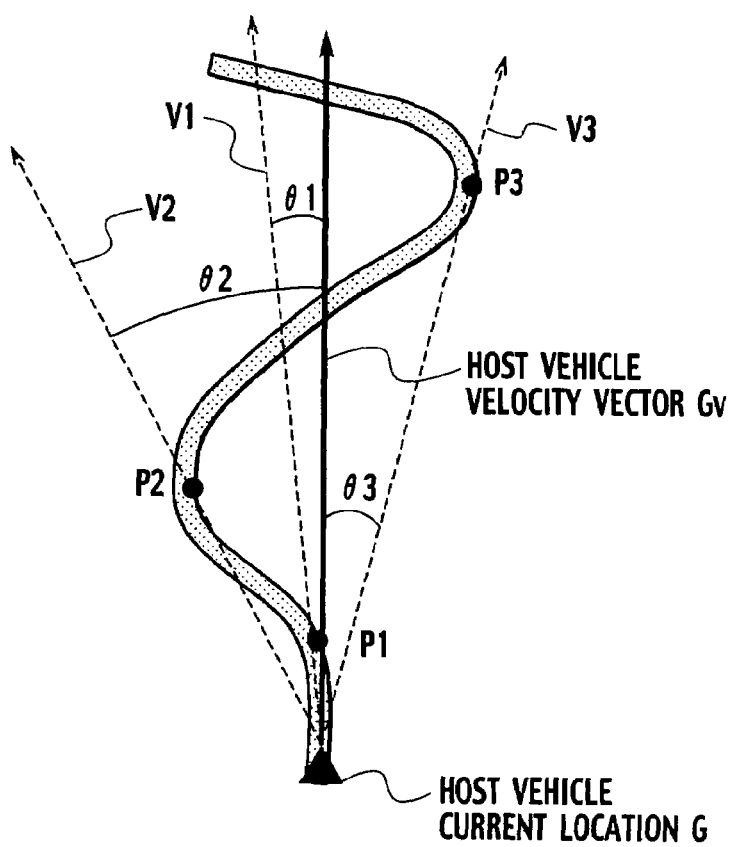
FIG. 5 explains how to calculate a deflection angle of a direction vector of a point where the point information related thereto is displayed with respect to a velocity vector of the vehicle.
Figure 6:
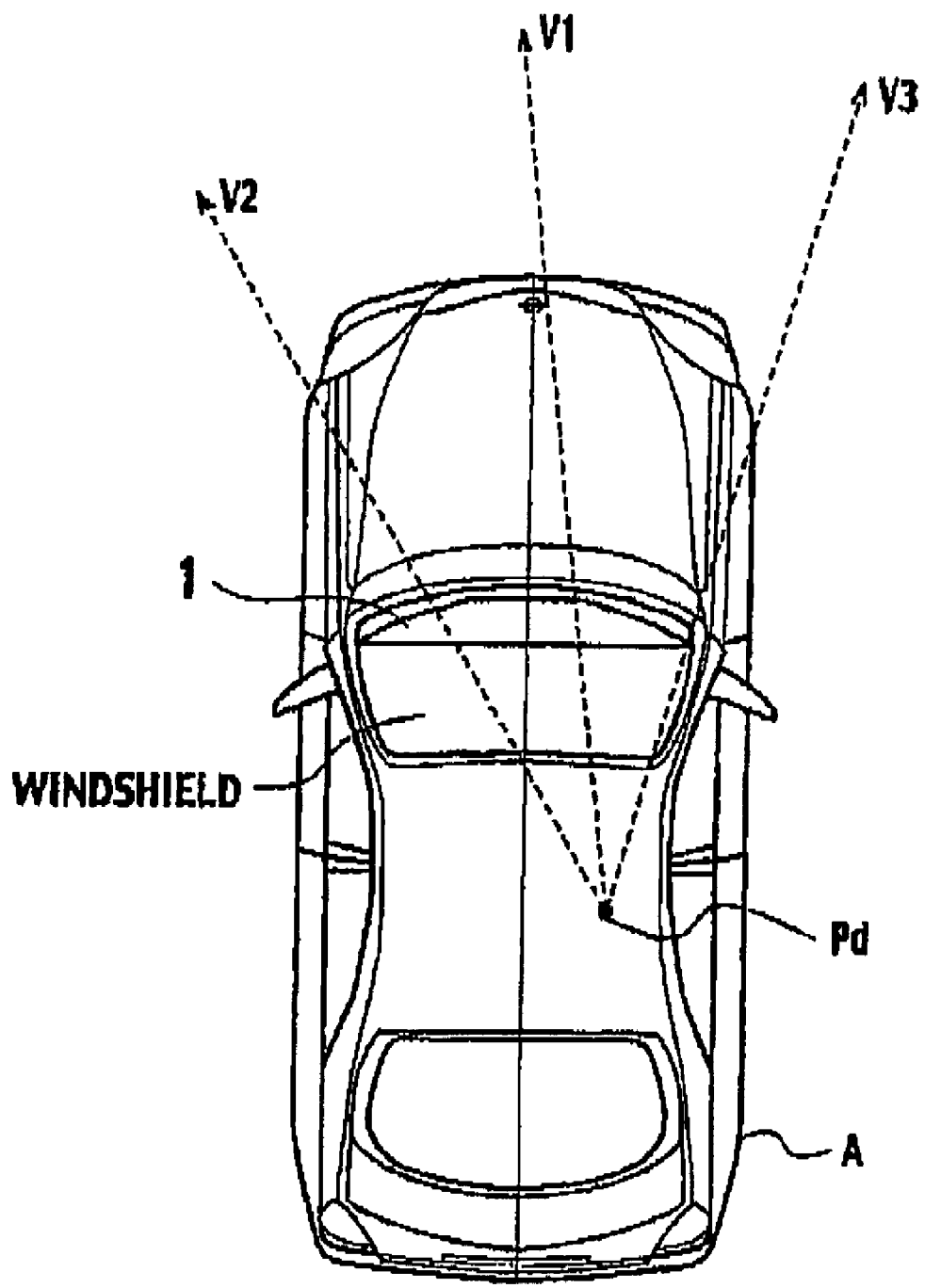
FIG. 6 explains how to determine a display position of the point information on a screen of the display device.

Moreover, as shown in FIG. 5, the display control unit 5 calculates direction vectors Vn (V1, V2, V3 in an example shown in FIG. 3) from the current location G of the host vehicle A to the relevant point Pn, and calculates direction vector angles θn (θ1, θ2, θ3 in an example shown in FIG. 5) of the direction vectors Vn with respect to the velocity vector Gv of the host vehicle A. Depending on the calculated direction vector angles θn, the display control unit 5 estimates directions, in which the display points Pn are actually located, on the basis of a driver's eye position Pd in the host vehicle A to determine positions on the screen Sc of the display device 1 in the relevant directions as display positions for the point information in a lateral direction of the display device 1.

Figure 7:
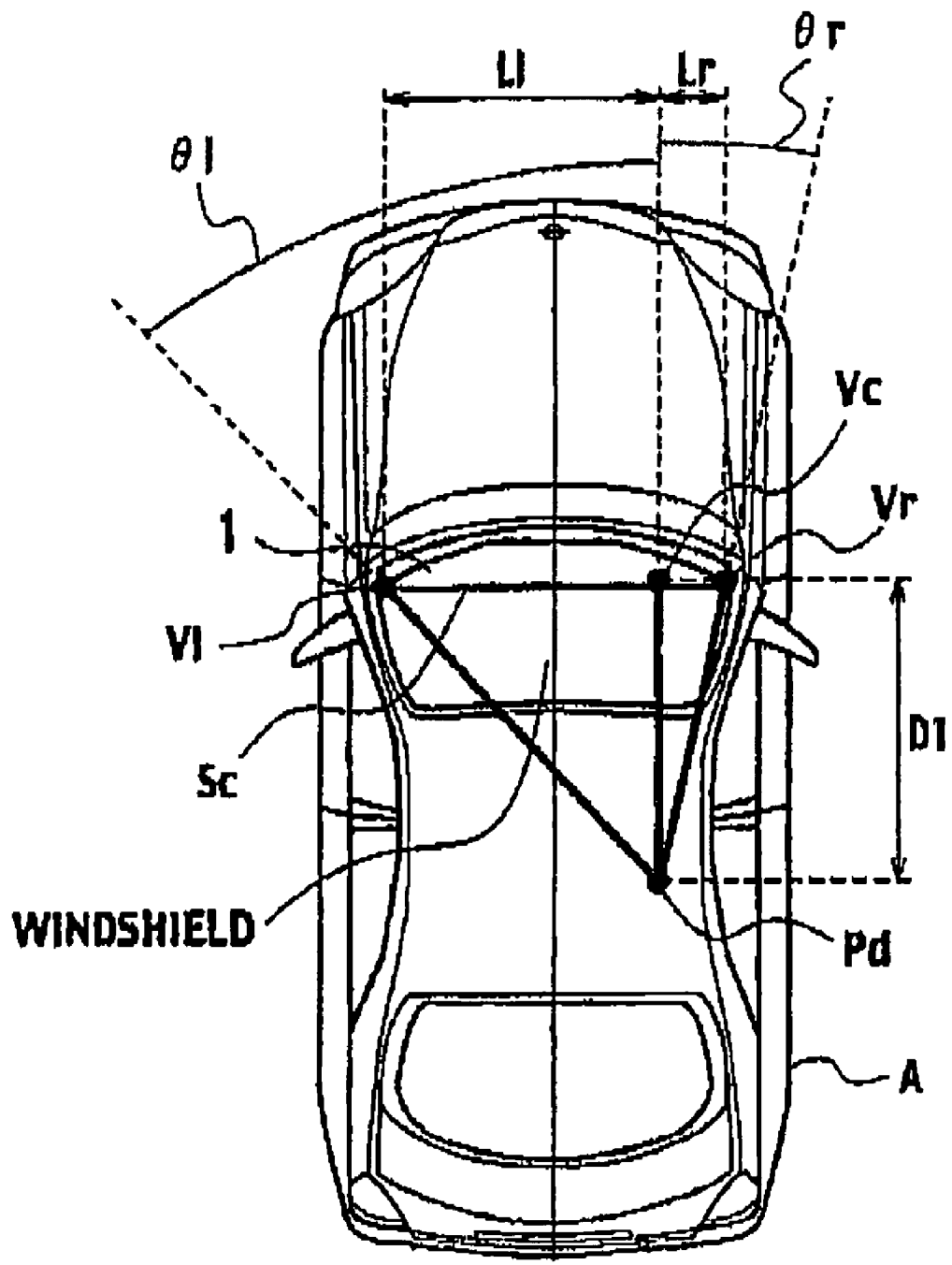
FIG. 7 is a schematic view illustrating a concrete method of determining a display position of the point information on the screen of the display device.

To go into detail, as shown in FIG. 7, the display control unit 5 calculates an angle (right end angle) θr, formed by a straight line passing through the driver's eye position Pd and Vc located in straight front of the driver's eye position Pd on the screen Sc, and another straight line passing through a right end Vr of a display area Da and the driver's eye position Pd, using a linear distance D1 from the driver's eye position Pd, preliminarily set for each vehicle, to the screen Sc of the display device 1, and the distance Lr from the point Vc to the right end Vr of the display area Da on the screen Sc. Likewise, the display control unit 5 calculates an angle (left end angle) θl, formed by a straight line passing through the driver's eye position Pd and the point Vc, and another straight line passing through the left end Vl of the display area Da and the driver's eye position Pd, using the linear distance D1 from the driver's eye position Pd to the screen Sc and the distance L1 from the point Vc located in straight front of the driver's eye position Pd on the screen Sc, to a left end Vl of the display area Da on the screen Sc.

If the direction vector angle θn of the direction vector Vn which connects the current location G of the host vehicle A and the display point Pn, with respect to the velocity vector Gv of the host vehicle A, remains within a range between the right end angle θr and the left end angle θl of the display device 1, the display control unit 5 determines a position on the screen Sc of the display device 1, in a direction of the direction vector angle θn from the driver's eye position Pd, to be a display position in the lateral direction thereof of the point information related to the point Pn. Moreover, in cases where the direction vector angle θn is out of the range between the right end angle θr and the left end angle θl of the display device 1, the display control unit 5 determines a position in the vicinity of the right end Vr of the display area Da, when the direction vector angle θn is deviated rightward from the right end Vr of the display area Da, or a position in the vicinity of the left end Vl of the display area Da, when the direction vector angle θn is deviated leftward from the left end Vl of the display area Da, to be the display position for point information related to the point Pn. When this takes place, the display control unit 5 provides a display of point information in a display mode showing a direction, in which the relevant point Pn is actually located, is deviated from the range of the display area Da on the screen Sc of the display device 1 or a display of such information in combination with an icon indicating such notification.

Further, the display control unit 5 determines the display positions for the point information related to the points Pn in a vertical direction of the display area Da on the screen Sc of the display device 1, depending on the drive distances Ln from the current location G of the host vehicle A to the relevant points Pn. More particularly, the display control unit 5 determines a vertical offset Vpcn such that when a distance from a lower end of the display area Da to the image of the point information related to the point Pn is assigned to be the vertical offset Vpcn, as the point Pn of the point information is closer to the current location G of the host vehicle A, the point information is displayed at a lower area of the display area Da. Furthermore, on the contrary, the display control unit 5 may be arranged to determine the vertical offset Vpcn such that as the point Pn of the point information is closer to the current location G of the host vehicle A, point information is displayed at an upper area of the display area Da.

In cases where as the point Pn of the point information is closer to the current location G of the host vehicle A, point information is displayed on the display area Da at the lower area thereof, it becomes possible to perform a reliable coordination between an actual point Pn and point information related to such point Pn. On the contrary, in cases where as the point Pn of the point information is closer to the current location G of the host vehicle A, point information is displayed on the display area Da at the upper area thereof, a situation results in which point information of the point Pn close proximity to the current location of the host vehicle A is displayed in a position close proximity to a focus point of the driver during driving. Thus, it is advantageous for the driver to more easily confirm point information of the point Pn closer to the current location G of the host vehicle A.

Figure 8:
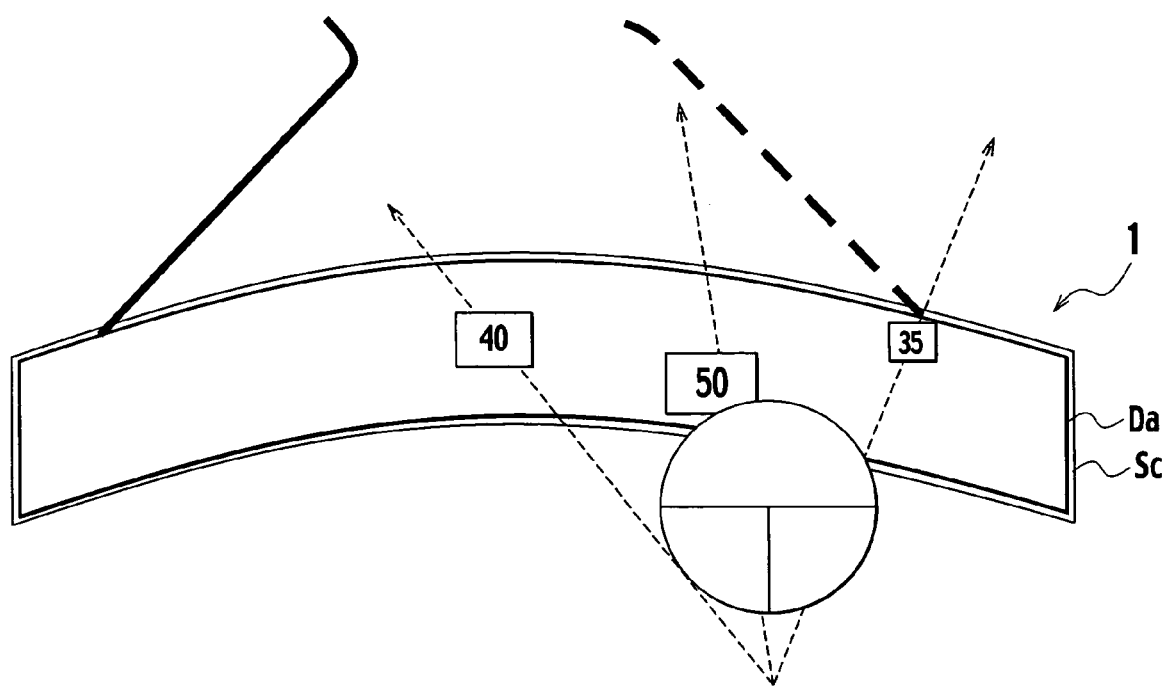
FIG. 8 shows the point information displayed on the screen of the display device in a manner coordinated with a driver's view during driving when looking ahead through a windshield.

With the driving support system SS1, the display control unit 5 determines the image size Iwn, the display color and display position of point information related to the relevant point Pn in a manner as set forth above and depending on such contents, controls the display device 1 such that as shown in FIG. 8, point information related to the display point Pn displayed on the horizontally long screen Sc of the display device 1, disposed at the lower area of a driver's view during driving when looking ahead through the windshield, in a pattern coordinated with the driver's view through the windshield. Also, a case shown in FIG. 8 indicates an example in which information on the advisory speed when passing the respective points are displayed on the screen Sc of the display device 1 as point information related to the points P1, P2, P3 shown in FIGS. 2, 3 and 5.

Also, like the examples shown in FIGS. 2, 3, 5 and 8, in cases where the point information acquisition unit 4 acquires point information on a plurality of points (P1, P2, P3) as the points Pn located within the given distance LR from the current location of the host vehicle A, basically, the display control unit 5 determines the image size Iwn, the display color and the display position for these plural point information, respectively, to allow these point information to be concurrently displayed at positions coordinated on the screen Sc of the display device 1. If plural point in formation are concurrently displayed, probabilities occur with the overlapping taking place in image of these point information and, in such a case, it becomes difficult for the driver to catch the display contents. Therefore, in cases where discrimination is made that the overlapping takes place in image of point information that are concurrently displayed, the display control unit 5 is operative to provide a display with a top priority on point information of the point closest to the current location G of the host vehicle A.

More particularly, in cases where discrimination is made that concurrently displaying point information related to the plural points in the positions coordinated in the screen Sc of the display device 1 causes the images of plural point information to overlap each other, the display control unit 5 is operative to select, among the plural points with the images of the point information thereof overlapping each other, a point closest to the current location G of the host vehicle A to allow point information related to such selected point to be displayed while avoiding a display of point information of the other non-selected points with the images of the point information thereof overlapping each other. Also, point information of the other non-selected points may be displayed in a thinner color than that originally displayed. Thus, providing the display with the top priority on point information of the point closest to the current location G of the host vehicle A, in cases where the images of point information overlap each other, avoids a display of overlapped images of point information, making it possible to provide the ease of viewing the display.

Figure 9:
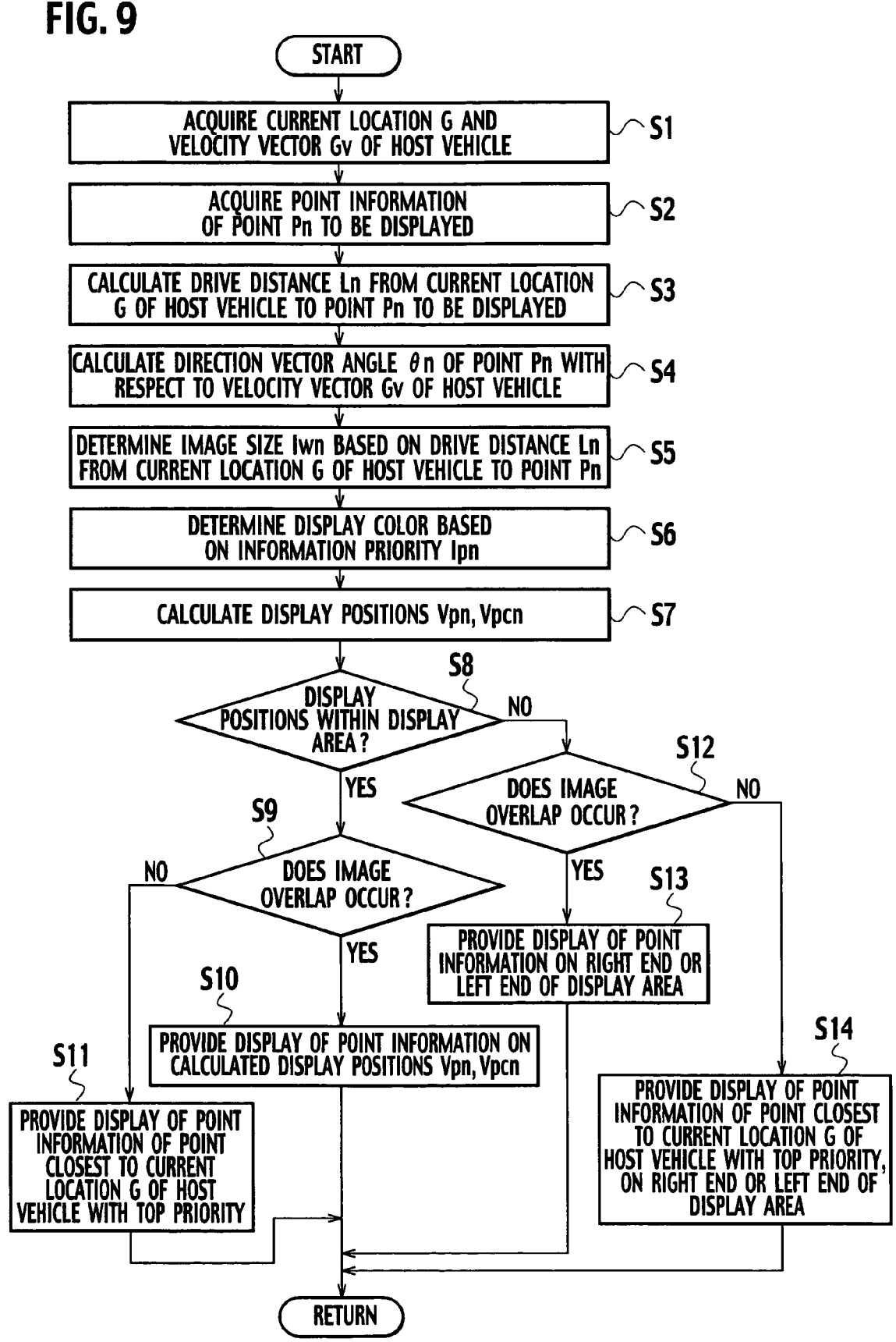
FIG. 9 is a flowchart showing a flow of operations to be executed by the driving support system according to the first embodiment of the present invention.

Next, a basic sequence of operations of the driving support system SS1 as configured set forth above is described below with reference to a flowchart of FIG. 9. A flow shown in FIG. 9 is repeatedly executed at a given frequency during running.

As the present flow starts, first in step S1, the vehicle location detector 2 detects a current location G and a velocity vector Gv of a host vehicle A. Information on the current location G and the velocity vector Gv of the host vehicle A is delivered to the point information acquisition unit 4 and the display control unit 5.

In consecutive step S2, the point information acquisition unit 4 executes map matching operation with road information stored in the traffic and road information database 3 based on the current location G of the host vehicle A, detected by the vehicle location detector 2, and the velocity vector Gv, to specify a road, in which the host vehicle A is located, and acquires road shape information within the given distance LR from the current location of the host vehicle A and point information on the points (display points) Pn located in the given distance LR on the specified road or a vicinity of the relevant road. Point information on the display points Pn acquired by the point information acquisition unit 4 are delivered to the display control unit 5. Also, point information of the display point, which has been treated as a target to be displayed in operation at the preceding cycle and which is also treated as a display point to be displayed in the current operation, may be utilized intact and no operation is executed to acquire new information.

In succeeding step S3, the display control unit 5 calculates a drive distance LR from the current location G of the host vehicle A to the display point Pn, based on the location coordinates of the current location G of the host vehicle A, the location coordinates of the display point Pn, and road shape information.

In next step S4, the display control unit 5 calculates a direction vector angle θn of the point Pn (an angle of the direction vector Vn of the display point Pn with respect to the velocity vector Gv) based on the velocity vector Gv of the host vehicle A, the location coordinates of the current location G of the host vehicle A and the location coordinates of the point Pn. Here, direction angle θn of the point Pn is set such that the direction angle overlapping with the velocity vector Gv of the host vehicle lies at 0 degree with right side designated in a positive (+) value and the left side in a negative (−) value. Also, in cases where a plurality of points (P1, P2, P3) are acquired as the display points Pn as shown in FIG. 5, the direction angles (θ1, θ2, θ3) are calculated for these plural points, respectively.

Figure 4:
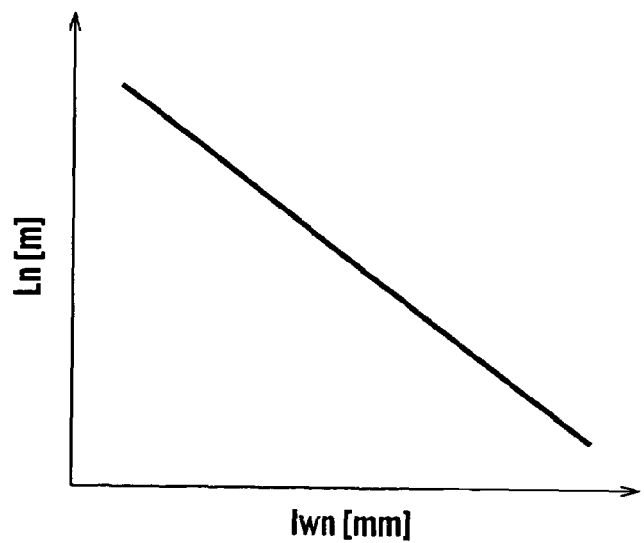
FIG. 4 shows a relationship between the drive distance from the current location of the vehicle to the point where the point information related thereto is displayed, and an image size of the point information related to the relevant point.

In subsequent step S5, the display control unit 5 determines the image size Iwn for point information related to the display point Pn based on drive distance Ln calculated in step S3. Here, the image size Iwn for point information represents a lateral width in case of a fixed aspect ratio and is determined such that in accordance with the relationship shown in FIG. 4, the longer the drive distance Ln, the smaller will be the image size Iwn whereas the shorter the drive distance Ln, the larger will be the image size Iwn. Accordingly, as the host vehicle A approaches to each point Pn, point information at this point Pn is displayed in a large size to be easily viewable. Moreover, in cases where the plural points (P1, P2, P3) are acquired as the display points Pn, the image sizes (lw1, lw2, lw3) for point information are calculated for these plural points, respectively. Also, as for point information, in which the image sizes Iwn determined herein are less than the given value, the display content is determined such that only representative icons added to relevant point information are displayed.

In next step S6, the display control unit 5 determines a display color of relevant point information depending on the priority Ipn, added to point information of the display point Pn, assigning red color for point information with a high priority, yellow color for point information with a middle priority and blue color for point information with a low priority. Also, when this takes place, if the content of point information to be displayed includes an advisory speed when passing the relevant point, the display control unit 5 calculates a required deceleration α using the current running speed Vl of the host vehicle A, the distance Ln to the point Pn and the advisory speed Vn at the point Pn. Then, comparison is made between the calculated required deceleration α and the two thresholds α1, α2 (α1>α2) and depending on whether or not the result of comparison belongs to α≧α1, α1>α>α2 or α2≧α, the degree of the required deceleration α is evaluated in three levels to allow the priorities Ipn to be sequentially allocated to "high", "middle" and "low" priorities upon which the display color of point information is determined.

Figure 10:
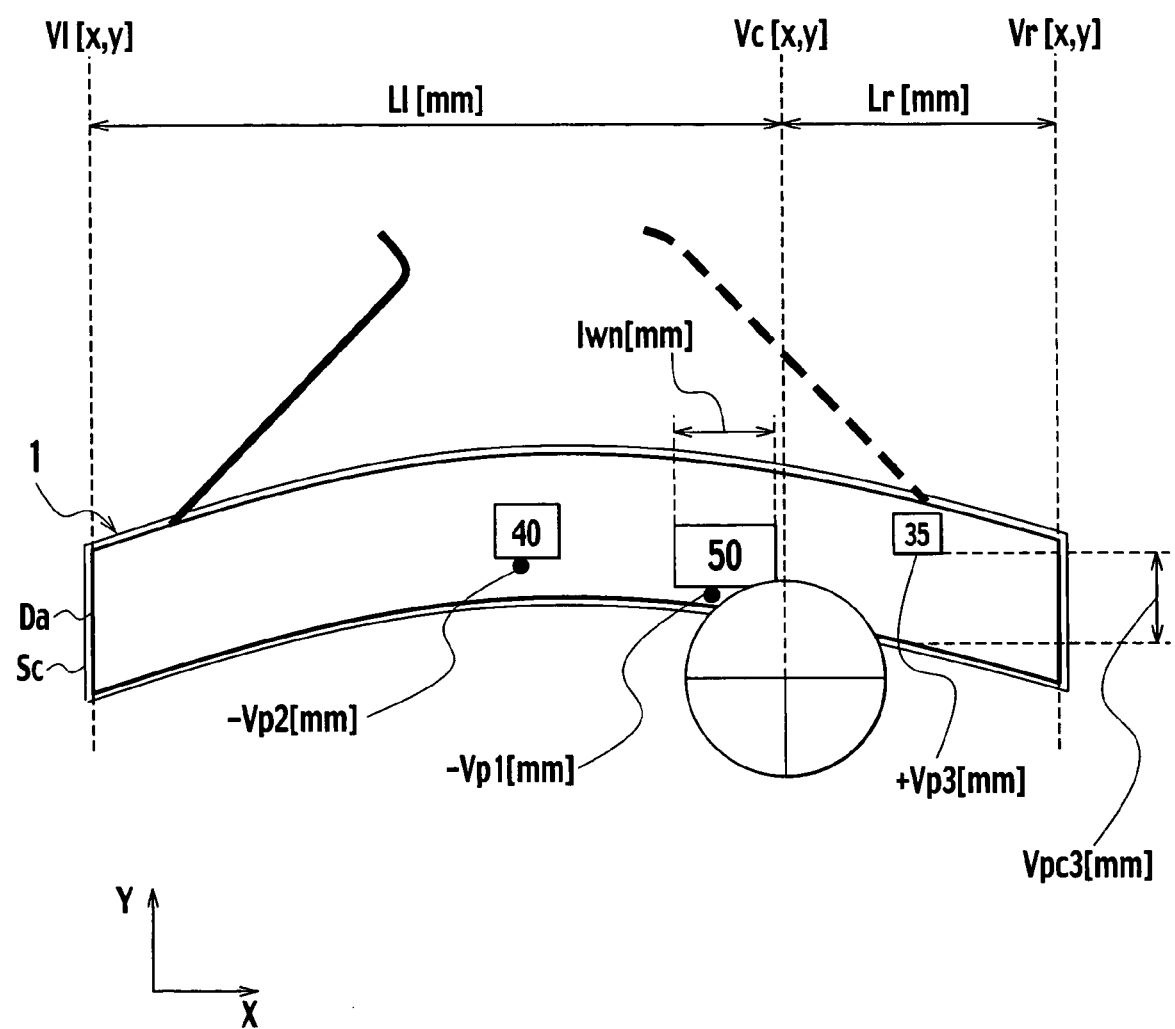
FIG. 10 is a schematic view for illustrating a method of calculating the display position of the point information on the screen of the display device.

In consecutive step S7, the display control unit 5 calculates a display position Vpn of point information (in a symbol "+" in a right direction and a symbol "−" in a left direction) in a lateral direction (x-axis direction in FIG. 10) on the display area centered at the point Vc in front of a driver, as shown in FIG. 1, using a driver's eye position Pd preliminarily set as a reference value, the point Vc located in front of a driver's eye position Pd on the screen Sc of the display device 1, the right end position Vr of the display area Dl on the screen Sc, the left end position Vl of the display area Da, the distance D1 between Pd-Vc, a distance between Vc-Vr, a distance between Vc-Vl, a direction vector angle θn of the display point Pn calculated in step S4, and a image size Iwn determined in step S5. Also, in cases where the display point Pn includes the plural points (P1, P2, P3) as shown in FIG. 10, display positions (Vp1, Vp2, Vp3) of point information are calculated for the plural display points, respectively.

Further, the display control unit 5 calculates a display position of point information (in terms of the vertically offset quantity Vpcn) in a vertical direction (along the y-axis in FIG. 10) on the display area, depending on the drive distance Ln directed toward the display point Pn calculated in step S3, such that the closer to the current location G of the host vehicle A the point Pn of the point information, the lower in the display area Da will be the display position for relevant point information to be displayed on the screen Sc of the display device 1. Also, in cases where the display points Pn include the plural points (P1, P2, P3) as shown in FIG. 10, display positions (Vpc1, Vpc2, Vpc3) of point information are calculated for the plural display points, respectively.

In succeeding step S8, the display control unit 5 discriminates, under conditions 1 and 2 described below, whether or not the display position Vpn, in terms of the lateral direction of point information calculated in step S7, falls in a range of the display area Da on the screen Sc of the display device 1, upon which if the display position Vpn falls in a range of the display area Da, the operation proceeds to step S9 and if the display position Vn is deviated from the range of the display area Da, the operation goes to step S12:

$$Vpn<0; Ll<Vpn-(Iwn/2) \quad \text{(Condition 1)}$$

$$Vpn>0; Lr>Vpn+(Iwn/2) \quad \text{(Condition 2)}$$

Figure 11:
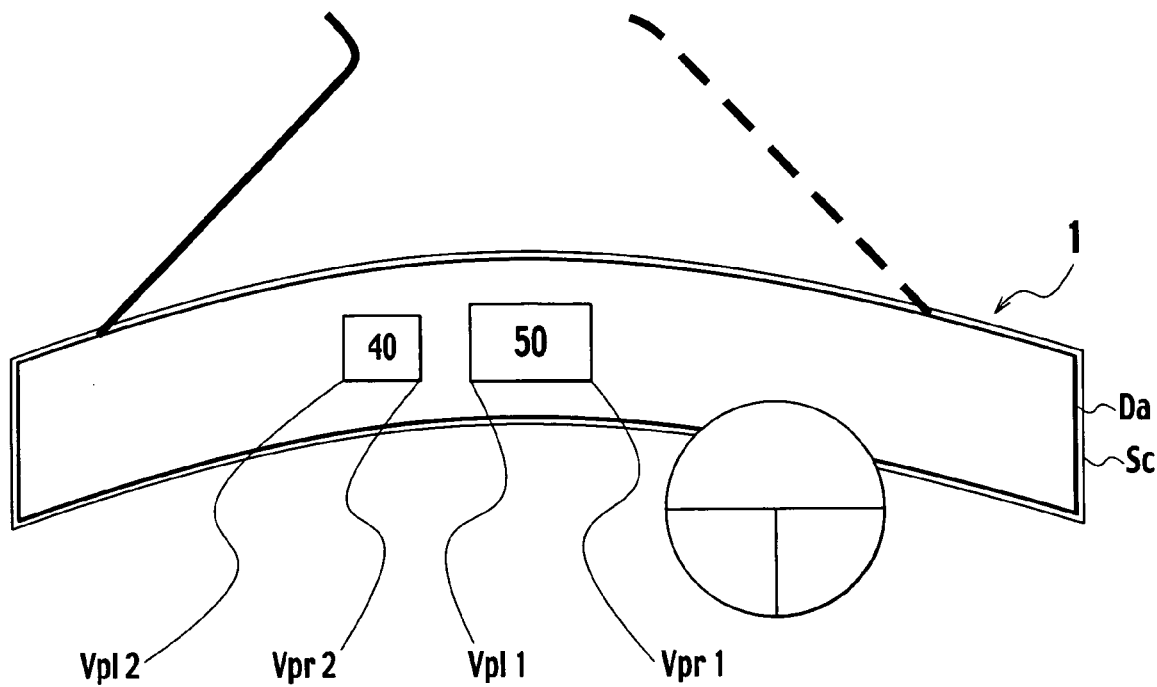
FIG. 11 is a schematic view for illustrating a method of discriminating image overlap between the point information on the screen of the display device.

In cases where discrimination is made in step S8 that the display positions Vpn, in terms of the lateral direction, for the plurality of point information, are present in the display area Da on the screen Sc of the display device 1, the display control unit 5 discriminates in subsequent step S9 whether or not images of respective point information overlap each other upon which in the presence of image overlap, the operation goes to step S10 whereas in the absence of image overlap, the operation goes to step S11. The image overlap is discriminated by acquiring the image right end Vprn (the image right end Vpr1 of point information at the point P1 and the image right end Vpr2 of point information at the point P2 in an example shown in FIG. 11) of respective point information and the image left end Vpln (the image left end Vpl1 of point information at the point P1 and the image left end Vpl2 of point information at the point P2 in an example shown in FIG. 11) of respective point information, as shown in FIG. 11, after which depending on these positional relationships, the discrimination is executed. Also, the image right end Vprn of respective point information is obtained in a formula expressed as Vprn=Vpn+(Iwn/2) and the image left end Vpln of respective point information is obtained in a formula expressed as Vpln=Vpn−(Iwn/2), based on the display position Vpn of relevant point information and the image size Iwn.

In step S10, the display control unit 5 allows the display positions Vpn, Vpcn, calculated in step S7, to be determined as the display positions of point information on the screen Sc of the display device 1 and to provide displays of point information related to the points Pn, where the point information related thereto are displayed, on the display positions Vpn, Vpcn on the screen Sc of the display device 1 in the image size Iwn and the display color determined in step S6.

Furthermore, in consecutive step S11, the display control unit 5 confirms the drive distances Ln from the current location G of the host vehicle A to the respective points Pn for plural point information whose images are discriminated to overlap each other in step S9, and selects the point, whose drive distance Ln is short from the current location G of the host vehicle A, that is, the point closer to the host vehicle A, as a display object on a priority base. Then, point information of the point, selected as the display object, is displayed on the display positions Vpn, Vpcn, resulting from calculation in step S7, on the screen Sc of the display device 1 in the image size Iwn, determined in step S5, and the display color determined in step S6.

On the contrary, if discrimination is made in step S8 that the display position Vpn in terms of the lateral direction of point information is deviated from the range of the display area Da on the screen Sc of the display device 1, then, the display control unit 5 discriminates in step S12 whether or not there are pluralities of point information, whose display positions Vpn are deviated from the range of the display area Da, on the right side or the left side of the display area Da, respectively. In this moment, if there is only one point information whose display position Vpn is deviated from the range of the display area Da, the operation goes to step S13, and if there are plural point information whose display positions Vpn are deviated rightward of the display area Da or if there are plural point information whose display positions Vpn are deviated leftward of the display area Da, the operation goes to step s14.

Figure 12:
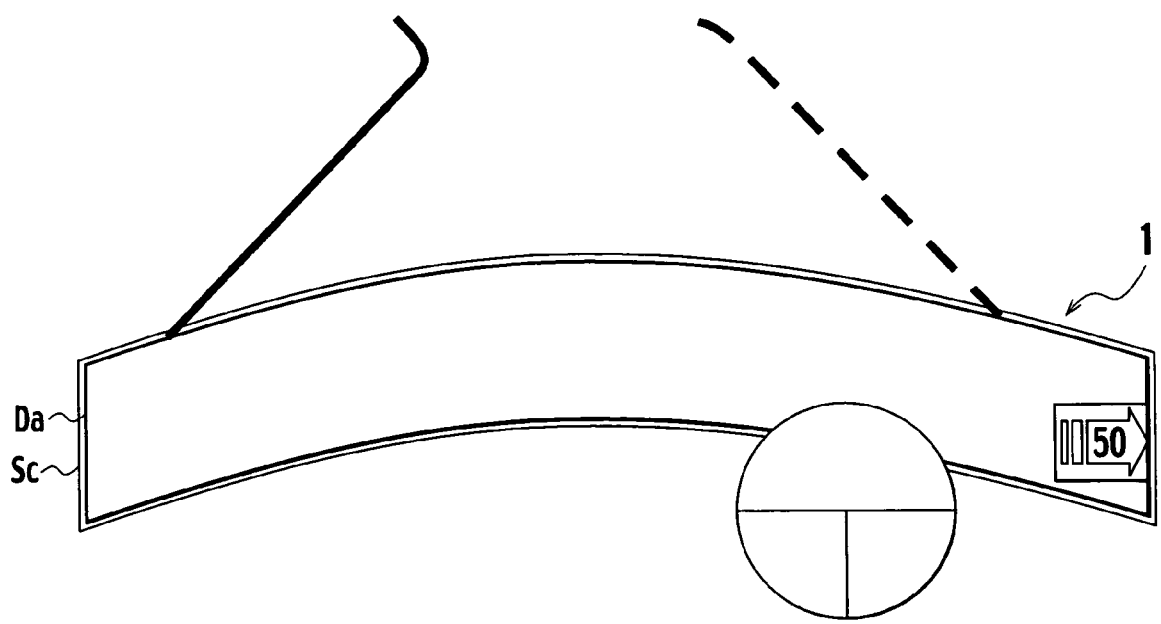
FIG. 12 shows the point information displayed in an area close to an end of a display area on the screen of the display device, when the display position is calculated to be deviated from a range of the display area.

The display control unit 5 operates in step S13 such that if point information, whose display position Vpn is deviated, is offset in the right side of the display area Da, the display position of the point information is set to a position close proximity to the right end Vr of the display area Da. As shown in FIG. 12, point information related to the point Pn, is displayed in the position close proximity to the right end Vr of the display area Da on the screen Sc of the display device 1 in the image size Iwn, determined in step S5, and the display color determined in step S6. Also, if point information, whose display position Vpn is deviated, is offset in the left side of the display area Da, the display position of point information is set to a position close proximity to the left end Vl of the display area Da, and the point information related to the point Pn is displayed in the position close proximity to the left end Vl of the display area Da on the screen Sc of the display device 1 in the image size Iwn, determined in step S5, and the display color determined in step S6. Moreover, in this moment, point information is displayed in a display mode to clarify that a direction of the point indicated by point information is deviated from the range of the display area Da on the screen Sc of the display device 1, or an icon indicative of such deviation is displayed adjacent to a vicinity of point information in combination therewith.

Further, in step S14, the display control unit 5 confirms the drive distances Ln from the current location G of the host vehicle A at the respective points for plural point information whose display positions Vpn, are discriminated in step S12 to be deviated from the range of the display area Da, and selects a point, whose drive distance Ln is short from the current location G of the host vehicle A, that is, a point closer to the host vehicle A, as the point where the point information related thereto is displayed on a priority base. Then, point information of the point to be displayed, is set to a vicinity of the right end Vr of the display area Da on the screen Sc of the display device 1 or a vicinity of the left end Vl of the display area Da (in the display position Vpcn in terms of the vertical direction) and point information related to the point Pn, is displayed in the image size Iwn, determined in step S5, and the display color determined in step S6. Also, when this takes place, point information is displayed in a display mode to clarify that a direction of the point indicated by point information is deviated from the range of the display area Da on the screen Sc of the display device 1, or an icon indicative of such deviation is displayed adjacent to a vicinity of point information in combination therewith.

Figure 13:
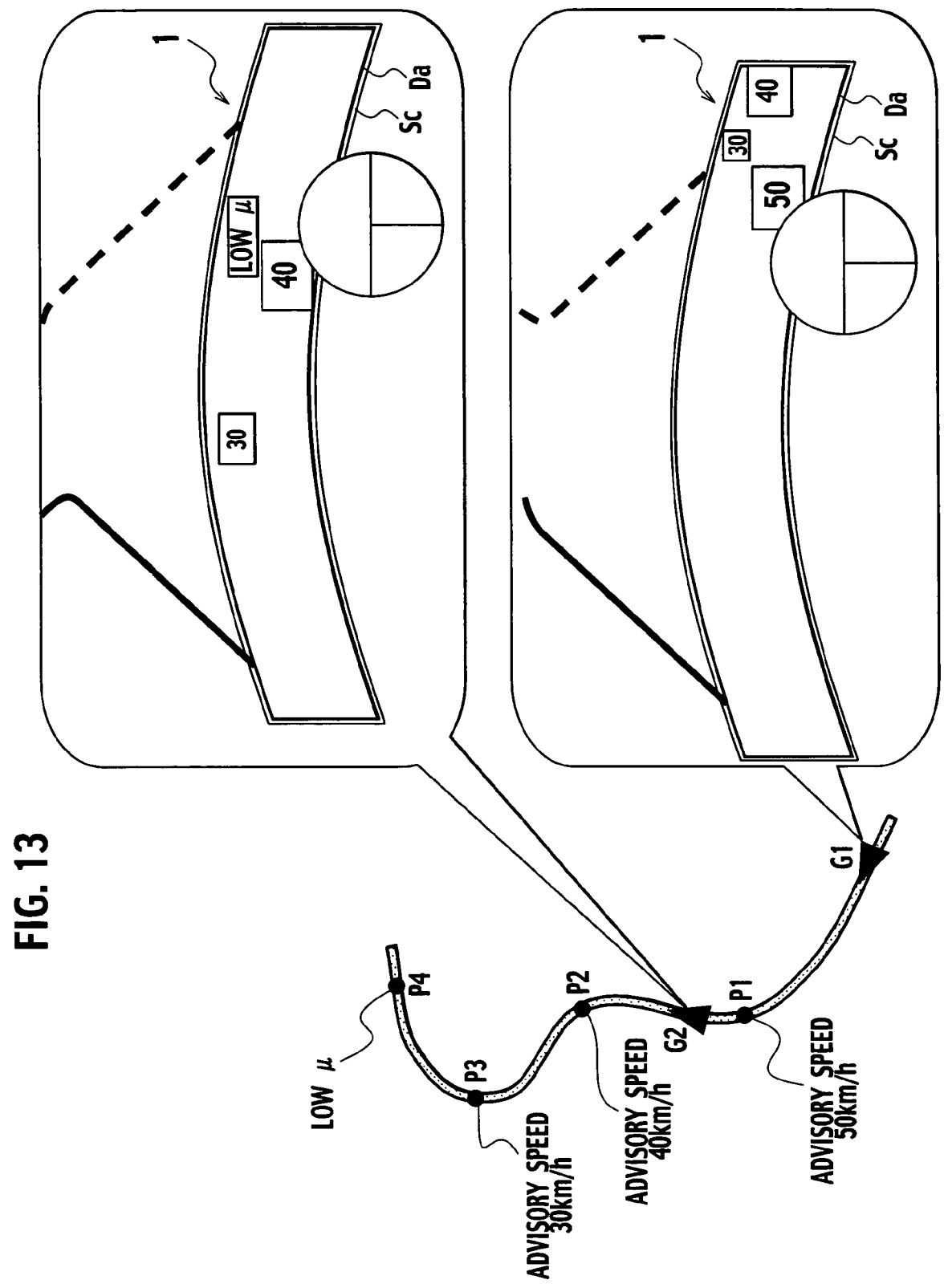
FIG. 13 explains how the point information changes/moves on the screen of the display device depending on a location of the vehicle on the route.

With the driving support system 1, a series of operations set forth above are repeatedly executed at a given cycle. This results in a capability of displaying information of the points on a road, varying every second, on the display area Da on the screen Sc of the display device 1, depending on a location of the host vehicle A in a pattern coordinated with a driver's view through the windshield. That is, in an example shown in FIG. 13, under a situation where the host vehicle A is running on the location G1, point information (in terms of advisory speeds at which the vehicle passes the points P1, P2, P3, respectively, in this case) related to the points P1, P2, P3 falling in a range within the given distance LR from G1, are displayed on the screen Sc of the display device 1 at the display positions, associated with the directions in which the display positions P1, P2, P3 are present in the display area Da in the image size Iwn associated with the drive distance LR from the host vehicle A. Then, as the host vehicle A reaches a position G2 in FIG. 13, point information (in terms of the advisory speeds at which the vehicle passes the points P1, P2, P3, respectively, and the status of surface resistance μ at the point P4) related to the points P1, P2, P3 falling in the rage within the given distance LR from G1, are displayed in the display area Da on the screen Sc of the display device 1 at the display positions associated with the directions, in which the display positions P2, P3, P4 are present, in the image size Iwn associated with the distance from the host vehicle A.

As set forth above, since the driving support system 1 is configured to display information, related to the points on the road, on the screen Sc of the display device 1 in the pattern coordinated with the driver's view through the windshield, information related to the relevant points are made possible to be intuitively and quickly recognized by the driver, enabling the driving operation of the driver to be appropriately supported.

Further, with the driving support system 1, executing the above-described series of operations at the given cycle in the repeated manner allows the display content of the display device 1 to be updated at a given cycle, allowing the display position to move such that as the host vehicle A comes close to the relevant position, the display position approaches the point Vc as the reference position on the screen Sc of the display device 1 in front of the driver, and making it possible to unify an optical flow in accordance with the movement of the display position of respective point information with extremely favorable viewing availability of respective point information.

Also, while with the example set forth above, under circumstances where discrimination is made that simultaneous displays of point information related to the plural display points Pn, causes the relevant images to overlap each other, the operation is executed to select, among these plural points Pn, a point with a short drive distance Ln from the current location of the host vehicle A, that is, a point closer to the host vehicle A, as a point where the point information related thereto is displayed on priority base. Alternative may be configured in a way to cause point information of the plural points Pn, which would otherwise be in image overlap, to be alternately displayed. In the driving support system SS1, repeatedly executing the series of operations set forth above at the given cycle, the display content of the display device 1 to be updated at the given cycle. Thus, temporarily storing operational content executed in the past operating cycles, upon which among point information of the plural points Pn that cause image overlap to occur when simultaneously displayed, point information are selected to be displayed while permitting point information to be alternately switched at every plural operation cycles, makes it possible to alternately display point information of the plural points Pn.

Further, in cases where the operation is executed to display point information of the plural points Pn, whose concurrent displays would otherwise cause image overlap to occur, in an alternate fashion, an alternative may be configured to determine a display time interval for each point information depending on the drive distance Ln from the current location G of the host vehicle A at each point Pn and the priority (which is preliminarily determined, as shown in FIG. 2, or which is calculated based on the required deceleration α) of each point information such that the shorter the drive distance Ln from the current location G of the host vehicle A, the longer will be the display time interval or the higher the information priority Ipn, the longer will be the display time interval for each point information.

Second Embodiment

Next, a driving support system SS2 of a second embodiment to which the present invention is applied is described below. The driving support system SS2 has the same configuration and general outline of operations as those of the driving support system SS1, set forth above, and slightly differs from the driving support system SS1 in content of operations to be executed when discrimination is made that simultaneous displays of point information of a plurality of points causes image overlap to take place. That is, the driving support system SS1 is configured to select either one of point information when discrimination is made that simultaneous displays of point information of a plurality of points causes image overlap to take place, and the driving support system SS2 is configured to display these plural point information in an overlapped manner wherein point information to be displayed on the uppermost layer is switched. Hereunder, the driving support system SS2 is described with a focus on characteristic portions, while omitting detailed descriptions of the same system configuration and operational content as those of the driving support system SS1 set forth above.

Figure 14:
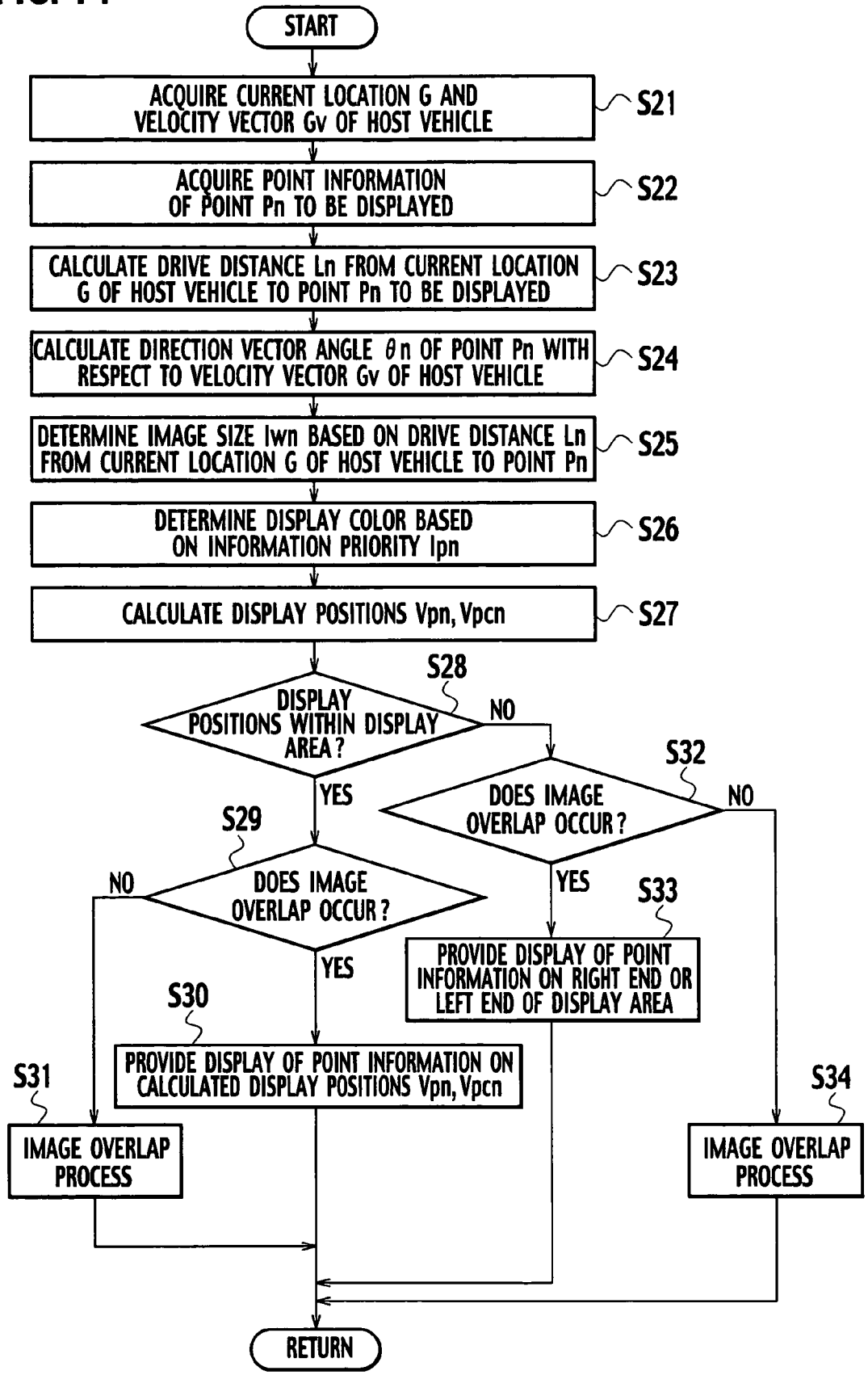
FIG. 14 is a flowchart showing a flow of operations to be executed by a driving support system according to a second embodiment of the present invention.

FIG. 14 is a flowchart illustrating a basic sequence of operations of the driving support system SS2. In the flowchart shown in FIG. 14, the operations in step S21 to step S30 are identical to those (the operations in step S1 to step S10 in the flowchart shown in FIG. 9) executed in the driving support system SS1 set forth above. Also, in the flowchart shown in FIG. 14, operations in step S32 and step S33 are identical to those (the operations in step S12 and step S13 in the flowchart shown in FIG. 9) of the driving support system SS1.

The driving support system SS2 renders the display control unit 5 operative to execute an image overlap process in step S31 or step S34 in a manner described below when discrimination is made in step S2 that if point information of a plurality of points are concurrently displayed, the overlapping takes place between relevant images or when discrimination is made in step S32 that if point information of a plurality of points are concurrently displayed, the overlapping takes place between relevant images.

Figure 15:
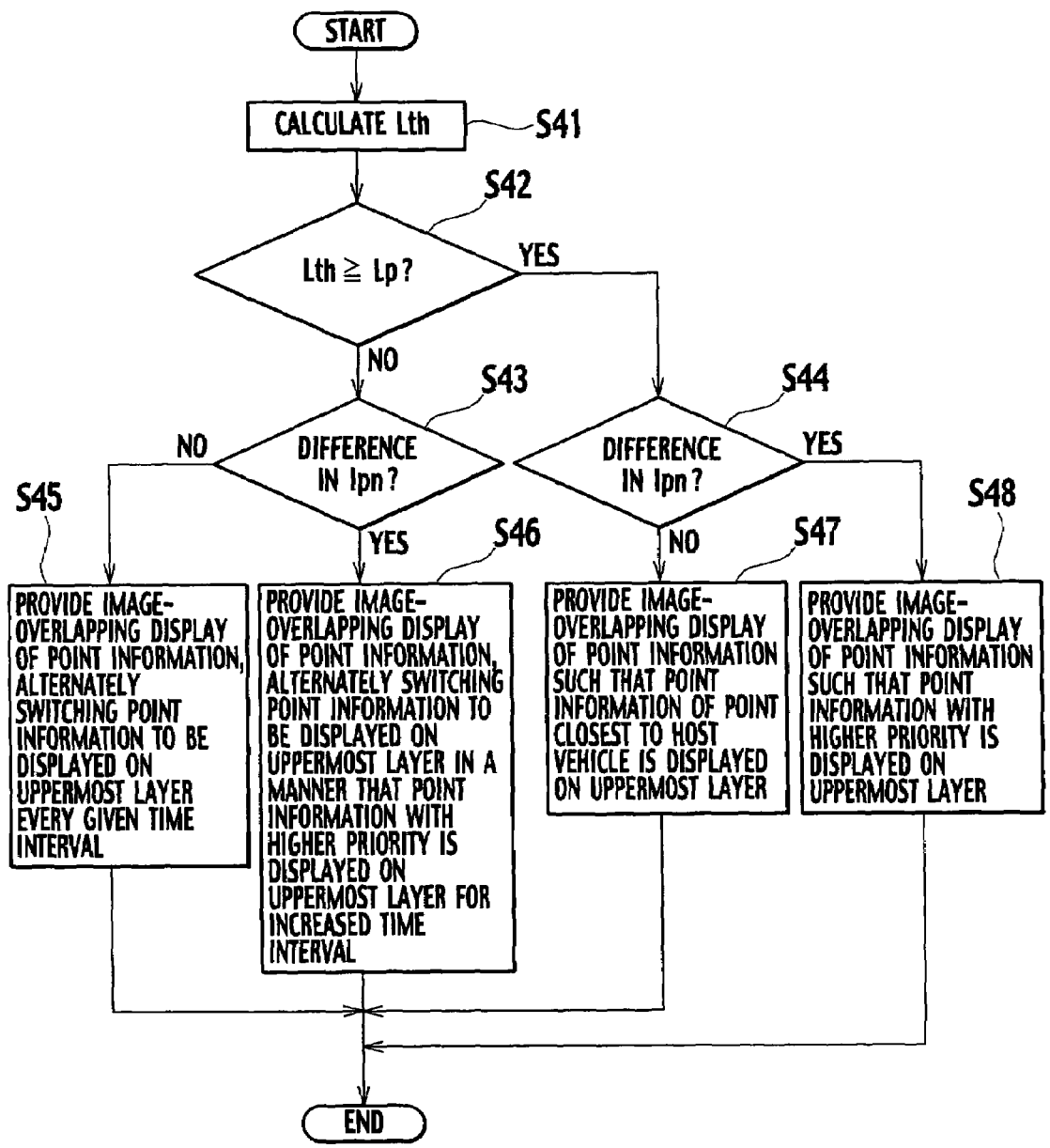
FIG. 15 is a flowchart showing a detail of an image overlap process in FIG. 14.

FIG. 15 is a flowchart for illustrating a detail of a characteristic image overlap process to be executed by the driving support system SS2. With the driving support system SS2, when discrimination is made in step S29 or step S32 in the flowchart of FIG. 14 that the presence of concurrently displays of point information of plural points causes an image overlap to take place, the display control unit 5 executes the operations in step S31 or step S34 to implement the image overlap process in accordance with the flowchart, shown in FIG. 15, to allow point information of the plural points to be displayed on the screen Sc of the display device 1 in an overlapped manner upon which depending on needs, point information are switched to be displayed on the uppermost layer.

During such image overlap process, first in step S41, the display control unit 5 calculates respective drive distances Lth between relevant points on the plural points which are discriminated to cause the image overlap. In particular, in an example shown in FIG. 16A, if discrimination is made that the image overlap takes place between point information related to the point P1 and point information related to the point P3, the display control unit 5 calculates a point-to-point drive distance of $Lth_{3-1}=L3-L1$ using the drive distances L1, L3, from the current location G of the host vehicle A to the respective points P1, P3, which have been already calculated. Further, in an example shown in FIG. 17A, if discrimination is made that the image overlap takes place between point information related to the point P1 and point information related to the points P3, the display control unit 5 calculates a point-to-point drive distance of $Lth_{2-1}=L2-L1$ using the drive distances L1, L2, starting from the current location G of the host vehicle A to the respective points P1, P3, which have been already calculated.

In next step S42, the display control unit 5 discriminates whether or not the point-to-point drive distance Lth, calculated in step S41, exceeds a given distance Lp (of 50 m, for example), and if the point-to-point drive distance Lth is less than the given distance Lp, the operation goes to step S43, whereas if the point-to-point drive distance Lth is greater than the given distance Lp, the operation goes to step S44. The display control unit 5 discriminates in step S43 or step S44 whether or not there is a difference in priority Ipn between these plural point information, and depending on a discrimination result, determines a display mode to be provided on the screen Sc of the display device 1 for these plural point information.

That is, if the point-to-point drive distance Lth is less than the given distance Lp with no difference in priority Ipn in point information of these points (with "No" indiscrimination result in step S43), the display device 5 executes the operation in step S45 to provide a display of point information while alternately switching point information to be displayed on the uppermost layer at every given time interval. These point information are overlapped in a display position (the display positions Vpn, Vpcn calculated in step S27 during the operation for the image overlap process in step S31 and a right end or a left end of the display area Da during the operation in step S34) on the screen Sc of the display device 1.

Figure 16A:
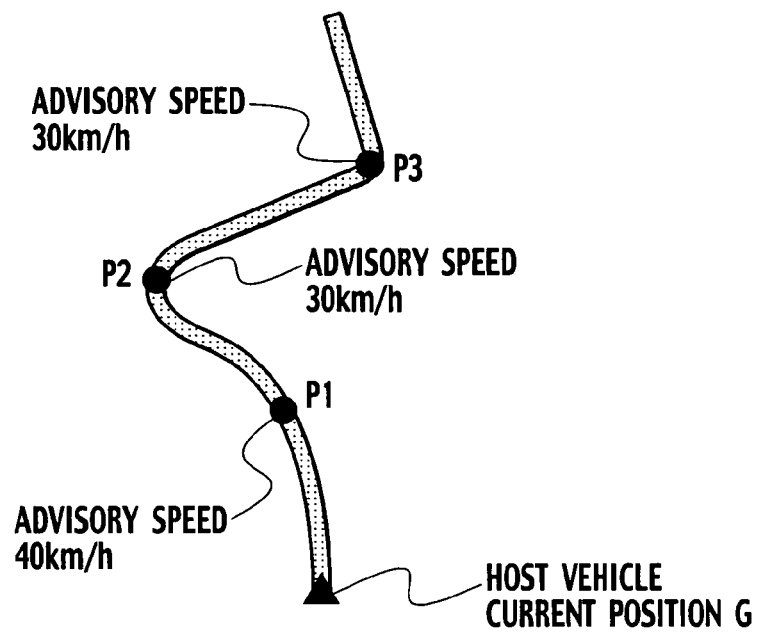
FIGS. 16A to 16C are views showing concrete examples of display modes for respective point information determined in the image overlap process, with FIG. 16A showing one example of a route of a vehicle, FIG. 16B showing a status wherein an image of point information related to a point P1 and an image of point information related to a point P3 are displayed in an overlapped manner such that the point information related to the point P1 appears on the uppermost layer and FIG. 16C showing a status wherein the image of point information related to the point P1 and the image of point information related to the point P3 are displayed in an overlapped manner such that point information related to the point P3 appears on the uppermost layer.
Figure 16B:
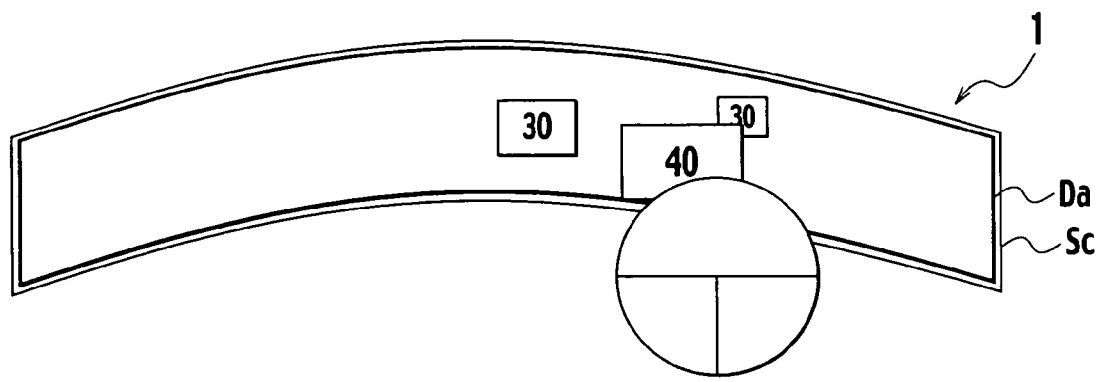
Figure 16C:
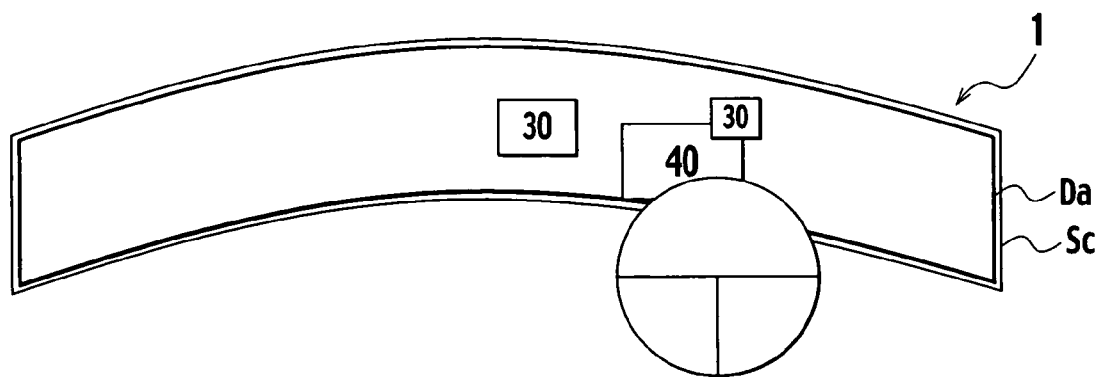

More particularly, under circumstances in the example shown in FIG. 16A, where image overlap takes place between point information related to the point P1, and point information related to the point P3, if the point-to-point drive distance $Lth_{3-1}$ between the points P1 and P3 is less than the given distance Lp with no difference in priority Ipn between the point information related to the point P1, and the point information related to the point P3 (Ip1=Ip3), the display control unit 5 executes the operation to cause point information of these points P1, P3 to be displayed in an overlapped manner while alternately switching between a display in which point information related to the point P1, appears on the uppermost position, as shown in FIG. 16B, and another display in which point information related to the point P3, appear on the uppermost position, as shown in FIG. 16C, at every given time interval.

Figure 17A:
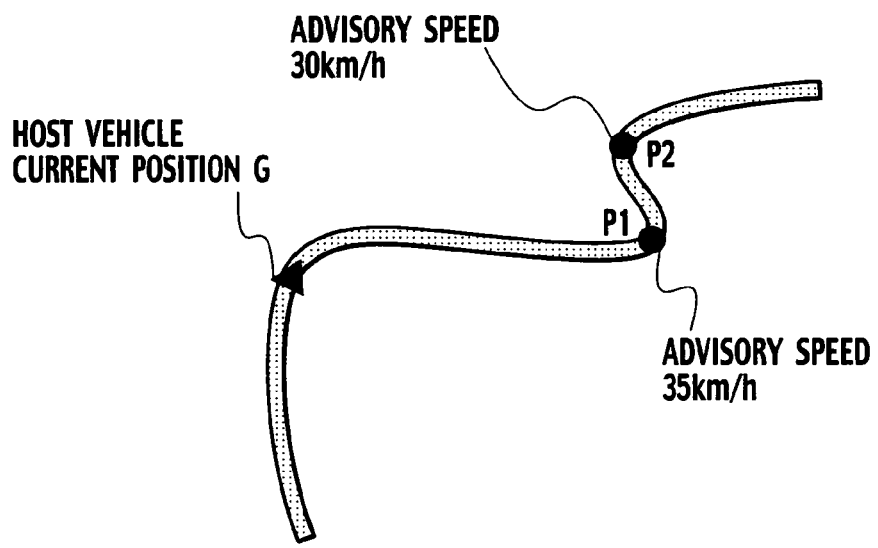
FIGS. 17A to 17C are views showing concrete examples of display modes for respective point information determined in the image overlap process, with FIG. 17A showing one example of the route of the vehicle, FIG. 17B showing a status wherein the image of point information related to the point P1 and the image of point information related to the point P2 are displayed in the overlapped manner such that the point information related to the point P1 appears on the uppermost layer and FIG. 17C showing a status wherein the image of point information related to the point P1 and the image of point information related to the point P2 are displayed in the overlapped manner such that point information related to the point P2 appears on the uppermost layer.
Figure 17B:
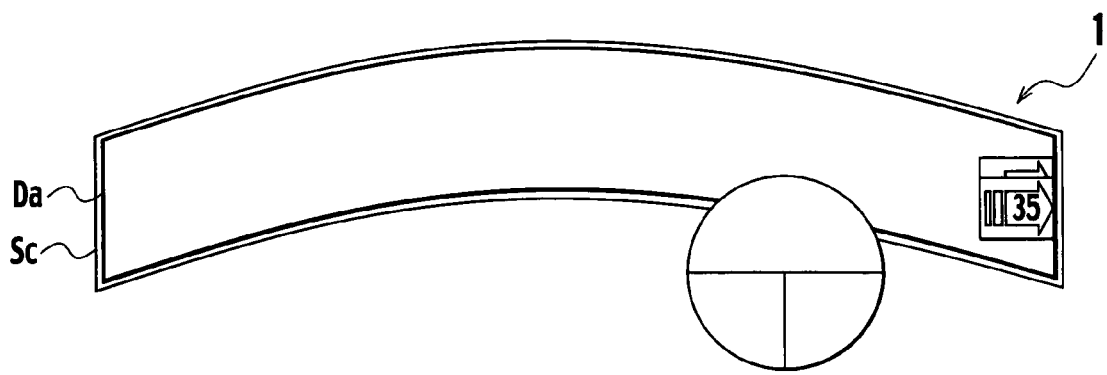
Figure 17C:
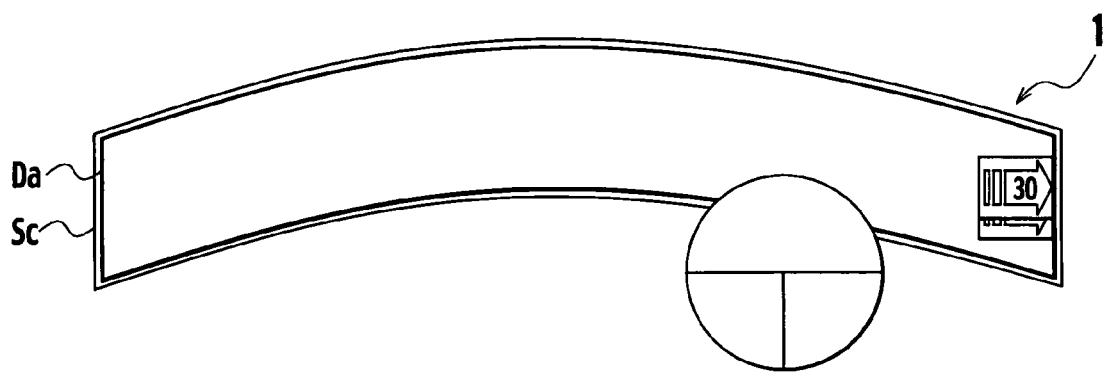

Further, under circumstances in the example shown in FIG. 17A, where the image overlap occurs between point information related to the point P1, and point information related to the point P2, if the point-to-point drive distance $Lth_{2-1}$ between the points P1 and P2 is less than the given distance Lp with no difference in priority Ipn between the point information related to the point P1, and the point information related to the point P2 (Ip1=Ip2), the display control unit 5 executes the operation to display point information of these points P1, P2 while permitting a display in which point information related to the point P1, appears on the uppermost position, as shown in FIG. 17B, and another display in which point information related to the point P2, appears on the uppermost position, as shown in FIG. 17C, to be alternately switched at every given time interval.

On the contrary, under circumstances where the point-to-point drive distance Lth is less than the given distance Lp with a difference in priority Ipn in point information of these points (with "Yes" in discrimination in step S43), the display device 5 executes the operation in step S46 to provide a display in a way to alternately switch point information to be displayed on the uppermost layer. These point information are displayed on the screen Sc of the display device 1 at a display position (the display positions Vpn, Vpcn, calculated in step S27, during the operation of the image overlap process in step S31 and the right end or left end of the display area Da during the operation in step S34) in an overlapped manner, such that the higher the information priority Ipn, the longer will be the time interval for information to be displayed on the uppermost layer.

More particularly, under circumstances in the example shown in FIG. 16A, where the image overlap occurs between point information related to the point P1, and point information related to the point P3, if the point-to-point drive distance $Lth_{3-1}$ between the points P1 and P3 is less than the given distance Lp, and point information related to the point P1, has a priority Ipn higher than that of point information related to the point P3 (Ip1>Ip3), the display control unit 5 allows point information of these points P1, P3 to be displayed in an overlapped manner while alternately switching point information to be displayed on the uppermost position such that a display shown in FIG. 16B is longer in time interval than a display shown in FIG. 16C. In contrast, in cases where the point-to-point drive distance $Lth_{3-1}$ is less than the given distance Lp, and point information related to the point P3, has a priority Ipn higher than that of point information related to the point P1 (Ip1<Ip3), the display control unit 5 allows point information of these points P1, P3 to be displayed in an overlapped manner while alternately switching point information to be displayed on the uppermost position such that the display, shown in FIG. 16C, is longer in time interval than the display state shown in FIG. 16B.

Further, under circumstances in the example shown in FIG. 17A, where the image overlap occurs between point information related to the point P1, and point information related to the point P2, if the point-to-point drive distance $Lth_{2-1}$ between the points P1 and P2 is less than the given distance Lp, and point information related to the point P1, has a priority Ipn higher than that of point information related to the point P2 (Ip1>Ip2), the display control unit 5 allows point information of these points P1, P2 to be displayed in an overlapped manner while alternately switching point information to be displayed on the uppermost position such that the display shown in FIG. 17B is longer in time interval than the display shown in FIG. 17C. In contrast, in cases where the point-to-point drive distance $Lth_{2-1}$ is less than the given distance Lp, and point information related to the point P2, has a priority Ipn higher than that of point information related to the point P1 (Ip1<Ip2), the display control unit 5 allows point information of these points P1, P2 to be displayed in an overlapped manner while alternately switching point information to be displayed on the uppermost position such that the display shown in FIG. 17C, is longer in time interval than the display shown in FIG. 17B.

Further, if the point-to-point drive distance Lth is greater than the given distance Lp with no difference in priority Ipn (with "No" in discrimination result in step S44), the display control unit 5 allows point information of the point, among plural point information, which is closest to the current location G of the host vehicle A to be displayed on the screen Sc of the display device 1 at the uppermost layer under an image overlap condition of these point information in the given display positions (the display positions Vpn, Vpcn, calculated in step S27, during the operation for the image overlap process in step S31 and the right end or left end of the display area Da during the operation in step S34).

More particularly, under circumstances in the example shown in FIG. 16A, where the image overlap occurs between point information related to the point P1, and point information related to the point P3, if the point-to-point drive distance $Lth_{3-1}$ between point information related to the point P1, and point information related to the point P3 exceeds the given distance Lp with no difference in priority Ipn between the point information related to the point P1, and the point information related to the point P3 (Ip1=Ip3), the display control unit allows point information of these points P1, P3 to be displayed in an overlapped manner such that point information related to the point P1, appears on the uppermost layer as shown in FIG. 16B.

Further, under circumstances in the example shown in FIG. 17A, where the image overlap occurs between point information related to the point P1, and point information related to the point P2, if the point-to-point drive distance $Lth_{2-1}$ between point information related to the point P1, and point information related to the point P2 exceeds the given distance Lp with no difference in priority Ipn between the point information related to the point P1, and the point information related to the point P2 (Ip1=Ip2), the display control unit 5 allows point information of these points P1, P2 to be displayed in an overlapped manner such that point information related to the point P1, appears on the uppermost layer as shown in FIG. 17B.

On the contrary, under circumstances where the point-to-point drive distance Lth is greater than the given distance Lp with a difference in priority Ipn between point information of these points (with "Yes" in discrimination in step S44), the display control unit 5 allows point information of the point, which has the highest priority Ipn among those of plural point information, to be displayed on the screen Sc of the display device 1 at the uppermost layer under an image overlap condition of these point information in the given display positions (the display positions Vpn, Vpcn, calculated in step S27, during the operation for the image overlap process in step S31 and the right end or left end of the display area Da during the operation in step S34).

More particularly, under circumstances in the example shown in FIG. 16A, where the image overlap occurs between point information related to the point P1, and point information related to the point P3, if the point-to-point drive distance $Lth_{3-1}$ between the point information related to the point P1, and point information related to the point P3, exceeds the given distance Lp, and the point information related to the point P1, has the priority Ipn higher than that of point information related to the point P3 (Ip1>Ip3), the display control unit 5 allows point information of these points P1, P3 to be displayed in an overlapped manner such that point information related to the point P1, appears on the uppermost layer as shown in FIG. 16B. In contrast, if the point-to-point drive distance $Lth_{3-1}$ between point information related to the point P1, and point information related to the point P3 exceeds the given distance Lp, and point information related to the point P3, has the priority Ipn higher than that of point information related to the point PI (Ip1<Ip3), the display control unit 5 allows point information of these points P1, P3 to be displayed in an overlapped manner such that point information related to the point P3, appears on the uppermost layer as shown in FIG. 16C.

Further, under circumstances in the example shown in FIG. 17B, where the image overlap occurs between point information related to the point P1, and point information related to the point P2, if the point-to-point drive distance $Lth_{2-1}$ between the points P1 and P2 exceeds the given distance Lp, and point information related to the point P1 has a priority Ipn greater than that of point information related to the point P2 (Ip1>Ip2), the display control unit 5 allows point information of these points P1, P2 to be displayed in an overlapped manner such that point information related to the point P1, appears on the uppermost layer as shown in FIG. 17B. In contrast, in the example shown in FIG. 17C, where the point-to-point drive distance $Lth_{2-1}$ between the points P1 and P2 exceeds the given distance Lp, and point information related to the point P2, has the priority Ipn higher than that of point information related to the point P1 (Ip1<Ip2), the display control unit 5 allows point information of these points P1, P2 to be displayed in an overlapped manner such that point information related to the point P2, appears on the uppermost layer as shown in FIG. 17C.

As set forth above in detail with reference to concrete examples, since the driving support system SS2 is configured to operate such that when discrimination is made that the presence of concurrent display of point information of plural points results in an overlap between these images, the display device 1 provides a display of point information of these plural points on the screen Sc in an overlapped manner and among plural point information to be displayed in the overlapped relationship, point information to be displayed on the uppermost layer, is switched depending on needs, it is possible for the driver to have advance information on noteworthy plural points located in a vicinity of the host vehicle A along a given direction, thereby enabling driving operations of the driver to be properly supported.

Further, the driving support system SS2 is configured to operate such that the point-to-point drive distances Lth for the respective points are obtained for plural point information to be displayed in the overlapped relationship, upon which if the point-to-point drive distance Lth is less than the given distance Lp, point information to be displayed on the uppermost layer are alternately switched. Thus, the driver is enabled to recognize point information of the plural points, such as in consecutive curves, which may adversely affect on driving, in an appropriate manner whereby the driving operation of the driver can be properly supported. Additionally, determining the display time interval to display point information on the uppermost layer based on the priority Ipn and the distance from the current location G of the host vehicle allows the driver to reliably recognize important information, enabling the driving operations of the driver to be further properly supported.

Third Embodiment

Next, a driving support system SS3 of a third embodiment to which the present invention is applied is described below.

Figure 18:
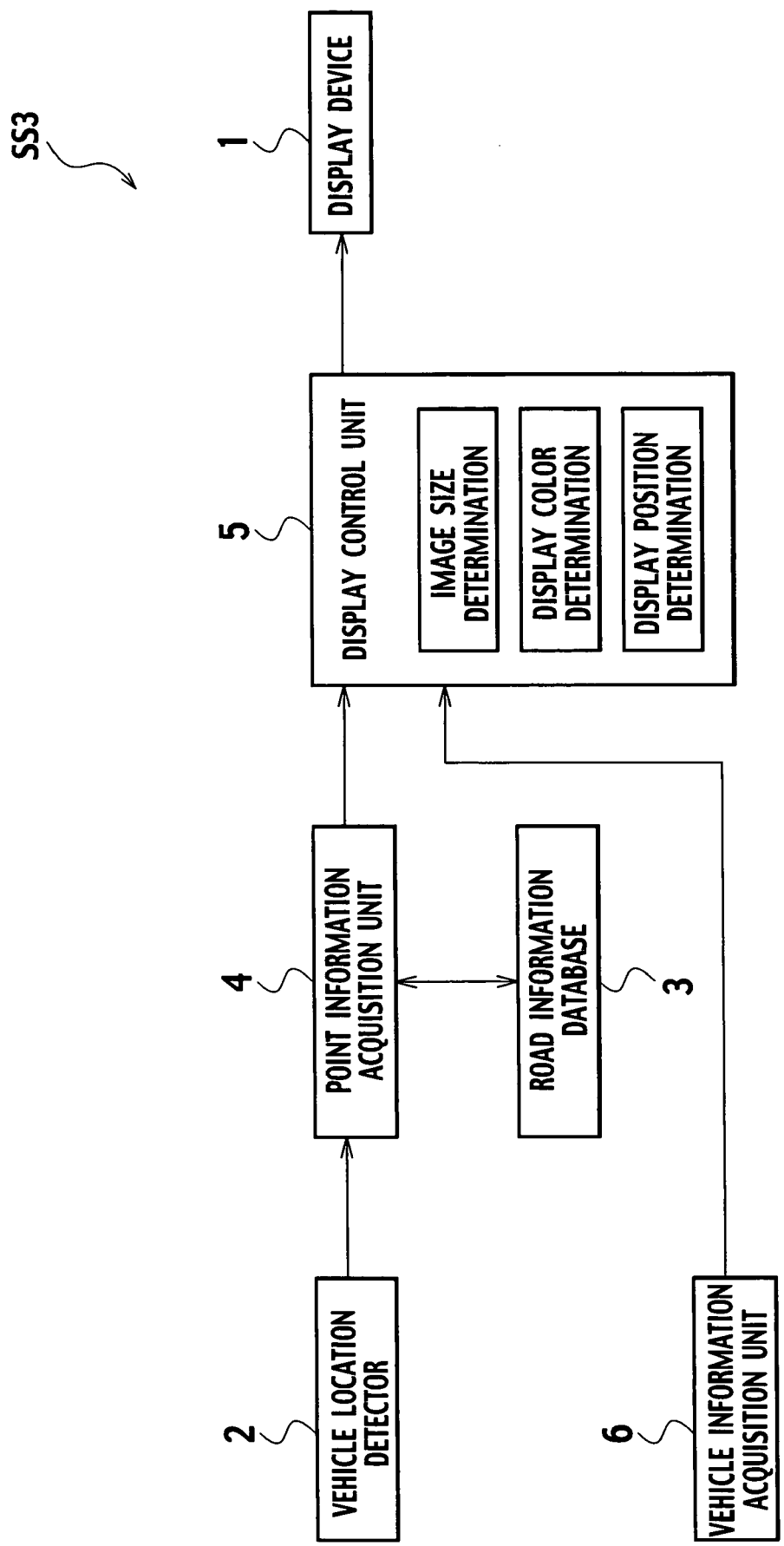
FIG. 18 is a block diagram showing configuration of a driving support system according to a third embodiment of the present invention.

The driving support system SS3 has a feature in that vehicle information indicative of behavior of the host vehicle A, is obtained for reflection on a display of point information. That is, as shown in FIG. 18, the driving support system SS3 is comprised of, in addition to the display device 1, the vehicle location detector 2, the traffic and road information database 3, the point information acquisition unit 4 and the display control unit 5, a vehicle information acquisition unit 6 that acquires vehicle information indicative of behavior of the host vehicle A, and is configured to supply the display control unit 5 with vehicle information acquired by the vehicle information acquisition unit 6. The display control unit 5 is configured to change a display update cycle of the display device 1 depending on vehicle information delivered from the vehicle information acquisition unit 6. That is, the driving support system SS3 is similar to the driving support system SS1, set forth above, in respect of basic portions of the configuration and general outline of operations for one cycle and, hence, the driving support system SS3 is described below with a focus on characteristic portions with details of the same configuration and operational content as those of the driving support system SS1 being herein omitted.

The driving support system SS3 acquires various vehicle information indicative of behavior of the host vehicle A, more particularly, information on a steering speed (rotational speed of a steering wheel), information on a steering angle and information on accelerating operation. Recently, a technology has been established wherein various on-vehicle electronic equipment are connected via a communication bus line to construct an on-vehicle LAN (Local Area Network) that is supplied with various vehicle information to allow vehicle information to be utilized as needed. Under circumstances where the on-vehicle LAN is constructed on the host vehicle A and electronic equipment, having a function as the display control unit 5, is connected as one node of this on-vehicle LAN, the on-vehicle LAN can be employed as the vehicle information acquisition unit 6.

With the driving support system SS3, under situations where the display control unit 5 obtains behavior of the host vehicle A based on vehicle information, delivered from the vehicle information acquisition unit 6, and behavior of the host vehicle A drastically varies, the display control unit 5 changes the display update cycle of the display device 1 so as to preclude the updating of the display of point information on the display device 1.

That is, under circumstances where behavior of the host vehicle A drastically varies, the direction of the point where the point information related thereto is displayed with respect to the host vehicle A abruptly varies. Hence, it is conceived that if displays of point information on the display device 1 are update data given cycle as usual, the displays become instable and provide hindrance to the driving operations of the driver in the opposite effect. Also, the circumstances wherein behavior of the host vehicle A drastically varies include a status wherein the driver bears a heavy driving load and the display provided on the display device 1 under such a status despoils the driver's attention to provide hindrance to the driving operations of the driver in the opposite effect.

Therefore, the driving support system SS3 is configured to operate such that in cases where discrimination is made based on vehicle information delivered from the vehicle information acquisition unit 6 that behavior of the host vehicle A drastically varies, a control on display of point information set forth above is temporarily interrupted to stop the updating of the display of point information.

More particularly, during a period in which, among vehicle information delivered from the vehicle information acquisition unit 6, the steering speed is confirmed and the detected steering speed is less than a given value, the control of display of point information set forth above repeatedly executed at a given cycle to update the display of point information, to be provided by the display device 5, whereas if the detected steering speed exceeds the given value, the control of display of point information, set forth above, is temporarily interrupted to stop the updating of the display of point information.

Figure 19:
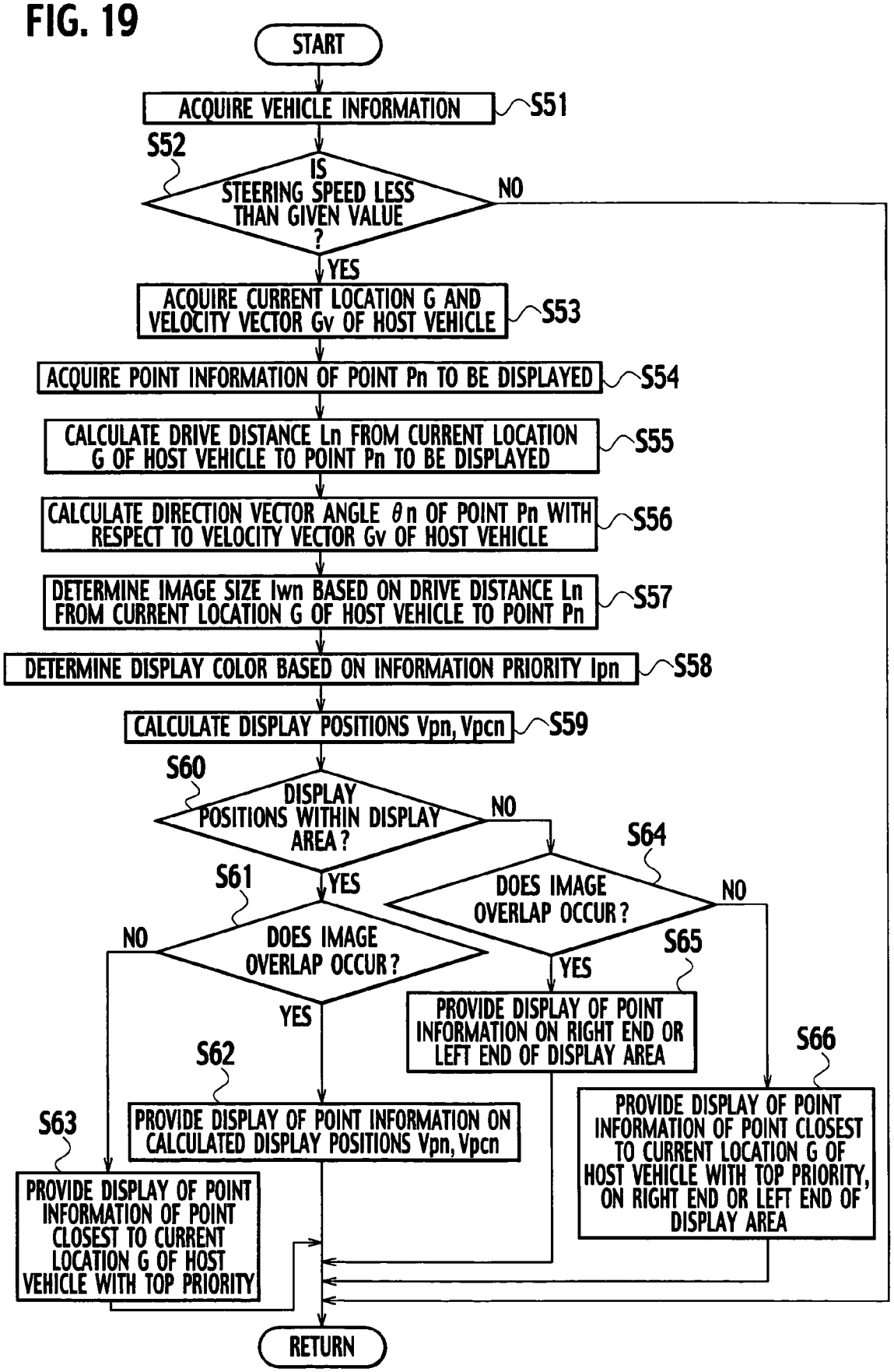
FIG. 19 is a flowchart showing a flow of operations to be executed by the driving support system according to the second embodiment of the present invention.

FIG. 19 is a flowchart showing a basic sequence of operations of the driving support system SS3. As shown in the flow chart, first in step S51, the vehicle information acquisition unit 6 acquires vehicle information to supply to the display control unit 5. In consecutive step S52, the display control unit 5 confirms the steering speed among vehicle information and discriminates whether or not the steering speed is less than a given value.

As a result of discrimination in step S52, if the steering speed is less than the given value, the operations subsequent to step S52 are executed. Also, the operations in steps S53 to S66 in the flowchart of FIG. 19 are identical to those of the operations (the operations in steps S1 to S14 in the flowchart of FIG. 9) of the driving support system SS1 set forth above and, so, detailed description of the same is herein omitted.

On the contrary, as a result of discrimination in step S52, if the steering speed exceeds the given value, none of the operations subsequent to step S52 are executed and the operations for current cycle are to be ended. As a result, the display condition for point information, determined upon the operations in a preceding cycle, is sustained during a period until discrimination is made in the operations in subsequent cycle that the steering speed is less than the given value, while interrupting the updating of the display of point information.

As set forth above, the driving support system SS3 is configured to operate such that in cases where discrimination is made based on vehicle information that behavior of the host vehicle A is drastically varies with the steering speed exceeding the given value, the control of display of point information is temporarily interrupted to stop the updating of the display of point information on the display device 1. This effectively prevents adverse affect caused by instable display resulting from drastic variation in behavior of the host vehicle A, and prevents the display of point information from providing hindrance to the driving operations of the driver in the opposite effect.

Also, while the example set forth above is configured to confirm the steering speed among vehicle information for making discrimination whether or not variation in behavior of the host vehicle A bears in a severe status, an alternative may be other vehicle information such as the steering angle, vehicle speed information and an operating displacement of an accelerator, or another alternative may be a combination of the steering speed and other vehicle information.

Furthermore, although the above-described example is configured to operate such that in cases where it is predicted that the display is to be instable, based on vehicle information that behavior of the host vehicle A drastically varies, the updating of the display of point information is interrupted, an alternative may be configured such that the driving load of the driver is discriminated based on vehicle information, upon which if the driving load of the driver is discriminated to be great, the updating of the display of point information is interrupted. That is, when the display of point information on the screen Sc of the display device 1 abruptly varies under a situation where the driving load of the driver is great, it is possible that the display catches the driver's eyes to provide hindrance to the driving operations. However, interrupting the updating of the display of point information makes it possible to avoid such an adverse affect in advance, when discrimination is made that the driver's driving load is heavy.

As for techniques of discriminating the driving load of the driver based on vehicle information, a method may be applied in which a steering entropy value, indicative of an instable condition of driving operation based on a steering displacement value (steering speed and steering angle), is calculated, and when the steering entropy value is high, discrimination is made that the driving load is high. Also, Detailed techniques for calculating the steering entropy value based on the steering displacement value are disclosed in Japanese Patent Application Laid-open Publications No. 2001-301639, No. 2002-255040 and No. 2003-246227.

Fourth Embodiment

Next, a driving support system SS4 of a fourth embodiment to which the present invention is applied is described. The driving support system SS4 has a fundamental configuration and general outline of operations that are similar to those of the driving support system SS1 set forth above, and differs from the driving support system SS1 in operations when determining display positions of various point information in cases where there are a plurality of point information to be displayed. That is, with the driving support system SS1, in cases where there are plural point information to be displayed, discrimination is made whether or not an overlap occurs in image between these plural point information, if these point information are simultaneously displayed, upon which if discrimination is made that the image overlap occurs, then, either one of point information is selected for display. In contrast, the driving support system SS4 is configured to operate such that display positions of point information related to the points except for a point with a distance shortest from the current location of the host vehicle A among a plurality of points are determined based on a relative positional relationship relative to the point whose distance from the current location of the host vehicle A is shorter than that of the relevant point. Hereunder, the driving support system SS4 is described below with a focus on characteristic portions and detailed descriptions of the same configuration and operational content as those of the driving support system SS1 are herein omitted.

Figure 20:
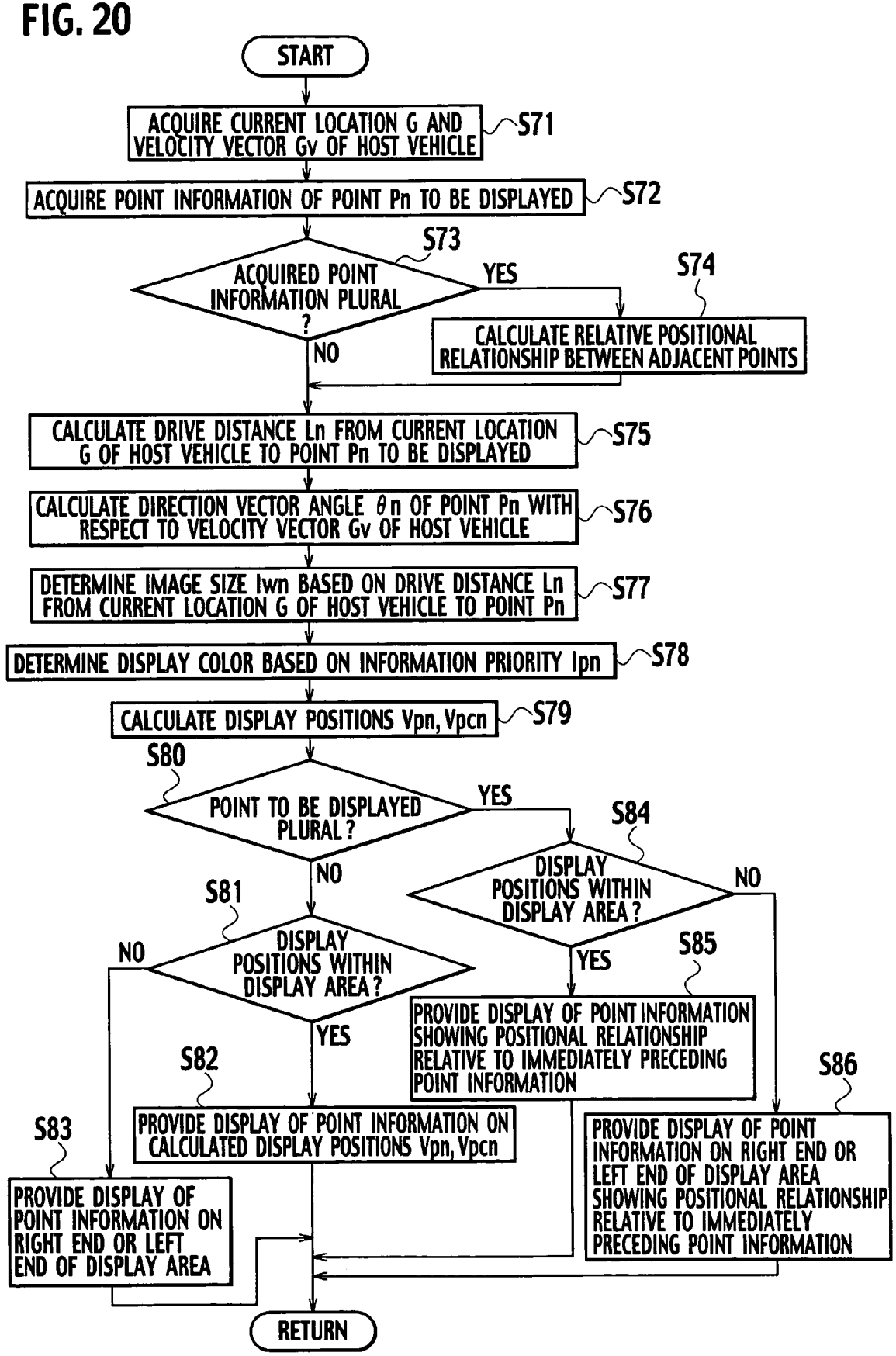
FIG. 20 is a flowchart showing a flow of operations to be executed by a driving support system according to a fourth embodiment of the present invention.

FIG. 20 is a flowchart showing flows of basic sequence of operations to be executed by the driving support system SS4. In the flowchart shown in FIG. 20, the operation in step S71 and the operation in step S72 are identical to those (the operations in step S1 and step S2 in the flowchart of FIG. 9) executed in the driving support system SS1 set forth above. With the driving support system SS4, after the point information acquisition unit 4 has acquired point information related to display points, the display control unit 5 discriminates whether or not there are plural point information acquired from the point information acquisition unit 4 to be displayed. If the display points are found to be plural, the display control unit 5 executes the operation in step S74 to calculate the relative positional relationship between adjacent points.

More particularly, in cases where there are plural point information to be displayed, for the points other than the point closest to the host vehicle A among these plural points, the display control unit 5 discriminates location of the relevant point with respect to a velocity vector of the host vehicle A when passing a point preceding the relevant point, that is, whether the relevant point is located on a right side or a left side with respect to the velocity vector of the host vehicle A when passing the point preceding the relevant point.

Figure 21:
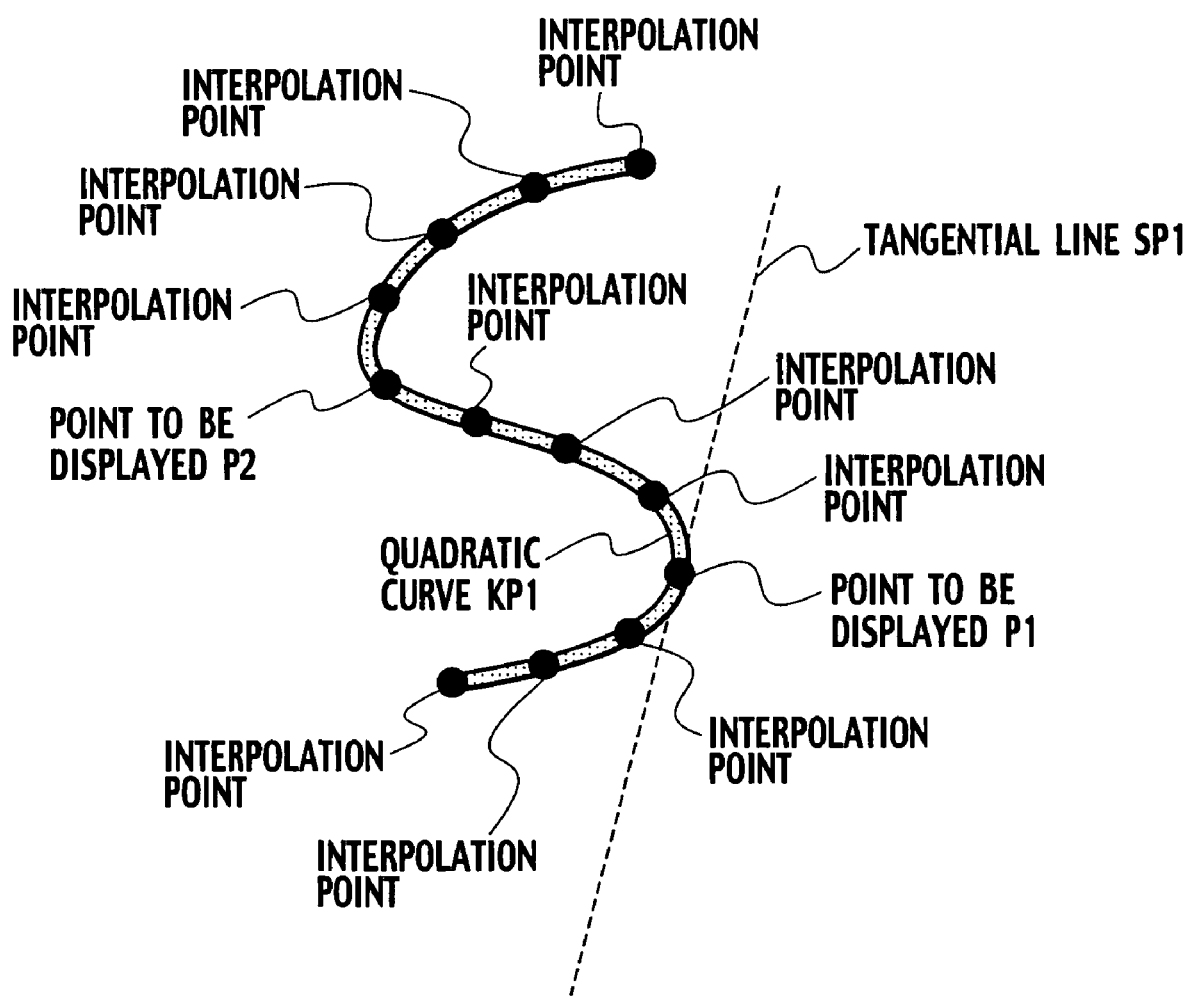
FIG. 21 is a view illustrating how to calculate a relative positional relationship between adjacent points except for the point closest to the vehicle in a case where plural point information are to be displayed.

In an example shown in FIG. 21, in cases where point information related to the point P1 and point information related to point P2, are to be displayed, the display control unit 5 calculates the relative positional relationship between the points P1 and P2 in a manner described below. The operation is first executed to acquire a quadratic curve function KP1 with the point P1 at the top thereof using the point P1 located on a side near the current location of the host vehicle A, and associated interpolation points (data contained in road shape information) next to the point P1, after which a tangential line SP1, passing through the point P1 of the curve function KP1. Then, the coordinates of the point P2, where the point information related thereto is to be displayed in a stage subsequent to the point P1, is converted to a coordinate system with SP1 plotted on a y-axis and an origin at P1, upon which the operation is executed to discriminate whether the position of the point P2 lies on the right side or the left side with respect to the velocity vector of the host vehicle A passing the point P1. Also, under circumstances where more than three display points are present, the above-described operations are executed for all the points except for the point closest to the host vehicle A, thereby calculating the relative positional relationship for the point on the near side.

With the driving support system SS4, when discrimination is made in step S73 that there is one point information to be displayed or after the relative positional relationship between the plural points has been calculated in step S74, the display control unit 5 executes the operations subsequent to step S75. Also, in the flowchart shown in FIG. 20, the operations in steps S71 to S79 are identical to those (the operations in steps S3 to S7 in the flowchart of FIG. 9) executed in the driving support system SS1 set forth above. Although the driving support system SS1 is configured such that for all the display points, the operation is executed to calculate display positions Vpn in a lateral direction of the display area on the screen Sc of the display device 1 in step S7, the driving support system SS4 is configured such that for only point information related to the point closest to the host vehicle A, the display position Vpn in the lateral direction of the display area on the screen Sc of the display device 1 is calculated.

With the driving support system SS4, in subsequent step S80, the display control unit 5 executes the operation to confirm whether or not point information to be displayed are plural, and depending on the result, determines the display position of point information on the screen Sc of the display device 1.

That is, in cases where only one point information is to be displayed (with "No" in step S80), the display control unit 5 discriminates in step S81 whether or not the display position Vpn in the lateral direction of the display area, calculated in step S79, falls in the display area Da on the screen Sc of the display device 1. If the display position Vpn falls in the display area Da, in succeeding step S82, the display positions Vpn, Vpcn, calculated in step S79, are determined as the display positions for point information to be provided on the screen Sc of the display device 1, and the point information are displayed in the display positions Vpn, Vpcn on the screen Sc of the display device in a size Iwn, determined in step S77, in a display color determined in step S78.

On the contrary, if the display position Vpn in the lateral direction of point information calculated in step S79 is deviated from the range of the display area Da, the display control unit 5 executes the operation in step S83 to determine a position in the vicinity of the right side or the left side of the display area Da as the display positions at which the point information is displayed on the screen Sc of the display device 1 in a size Iwn, determined in step S77, in a display color determined in step S78.

Further, in cases where plural point information are to be displayed (with "Yes" on discrimination in step S80), the display control unit 5 executes the operation in step S84 to discriminate whether or not a display position in the lateral direction of point information of the point closest to the current location of the host vehicle A falls in the display area Da on the screen Sc of the display device 1, that is, whether or not the display position Vpn in the lateral direction of point information, calculated in step S79, falls in the display area Da on the screen Sc of the display device 1. If the display position Vpn remains inside the display area Da, in consecutive step S85, the display position on the screen Sc of the display device 1 for point information of the point closest to the current location of the host vehicle A is determined as the display position Vpn, Vpcn, calculated in step S79, and the display positions of the other point information are determined to be positions, which enable for the driver to intuitively and quickly recognize the positional relationship relative to the immediately preceding point, based on the relative positional relationship between the points calculated in step S74, upon which these point information are displayed in a size Iwn, determined in step S77, in a display color determined in step S78.

Figure 22A:
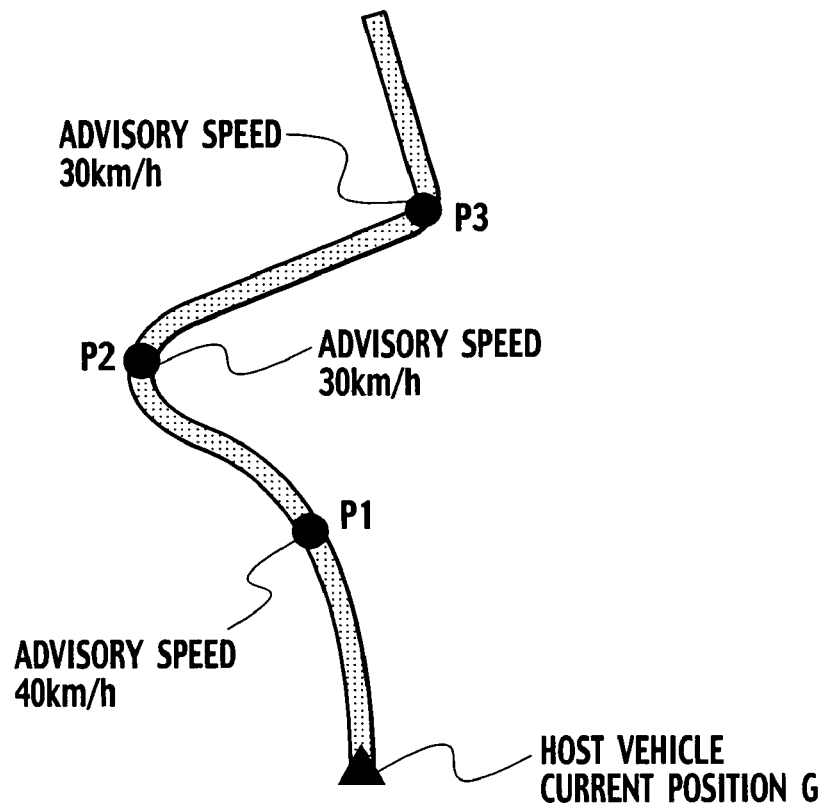
FIGS. 22A and 22B are views showing concrete examples of display positions of point information determined based on the relative positional relationship between the adjacent points, with FIG. 22A showing one example of a route of the vehicle and FIG. 22B showing examples of display of point information related to points P1, P2, P3 in FIG. 22A.
Figure 22B:
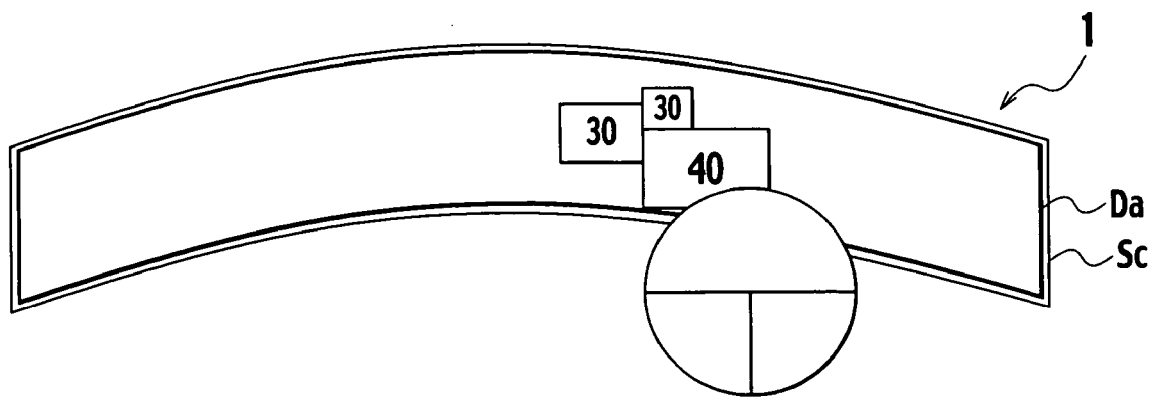

More particularly, under circumstances where point information to be displayed include point information related to the point P1, point information related to the point P2 and point information related to the point P3, respectively, the point P2 lies on the left side with respect to the velocity vector of the host vehicle A passing the point P1 closest to the current location G of the host vehicle, and the point P3 lies on the right side with respect to the velocity vector of the host vehicle A passing the point P2. Thus, as shown in FIG. 22, the display control unit 5 allows point information related to the point P1, to be displayed in the display position calculated in step S79, while having point information related to the point P2, displayed in an area on a left side of the point information related to the point P1 and permitting point information related to the point P3, displayed in an area on a right side of the point information related to the point P2.

In the mean while, if the display position Vpn in the lateral direction of point information calculated in step S79 is deviated from the display area Da, the display control unit 5 executes the operation in step S86 to determine a display position on the screen Sc of the display device 1 for point information closest to the current location of the host vehicle A to be a position in the vicinity of the right side or in the vicinity of the left side of the display area Da, while having the display position for the other point information be at a position, which enables the driver to intuitively and quickly recognize the positional relationship relative to the immediately preceding point, based on the relative positional relationship between the points calculated in step S74, upon which these point information are displayed in a size Iwn, determined in step S77, in a display color determined in step S78.

Figure 23A:
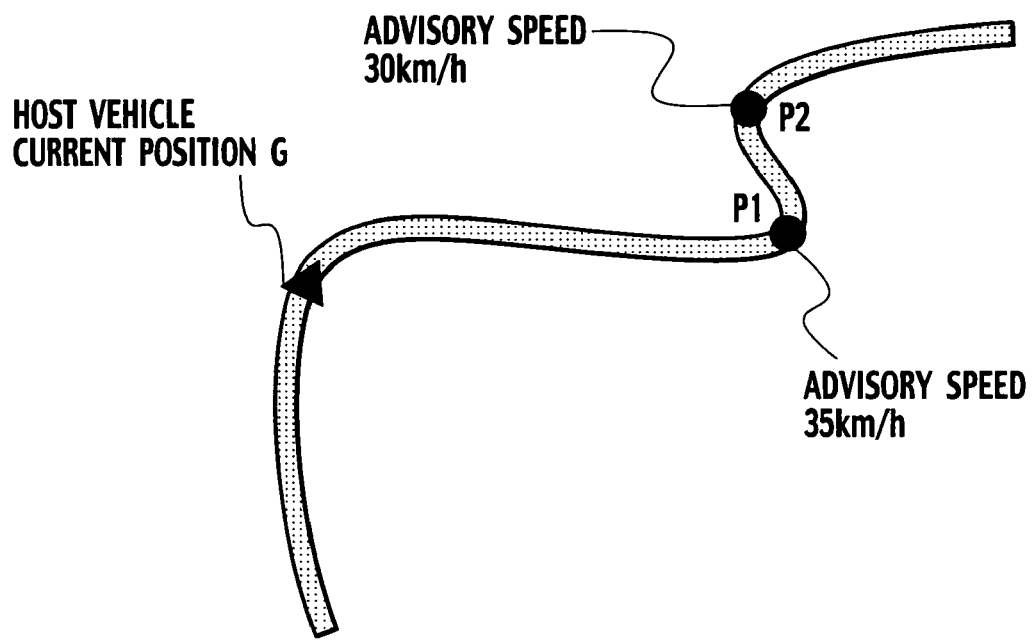
FIGS. 23A and 23B are views showing concrete examples of display positions of point information determined based on the relative positional relationship between the adjacent points with FIG. 23A showing one example of a route of the vehicle and FIG. 23B showing examples of display of point information related to points P1, P2 in FIG. 23A.
Figure 23B:
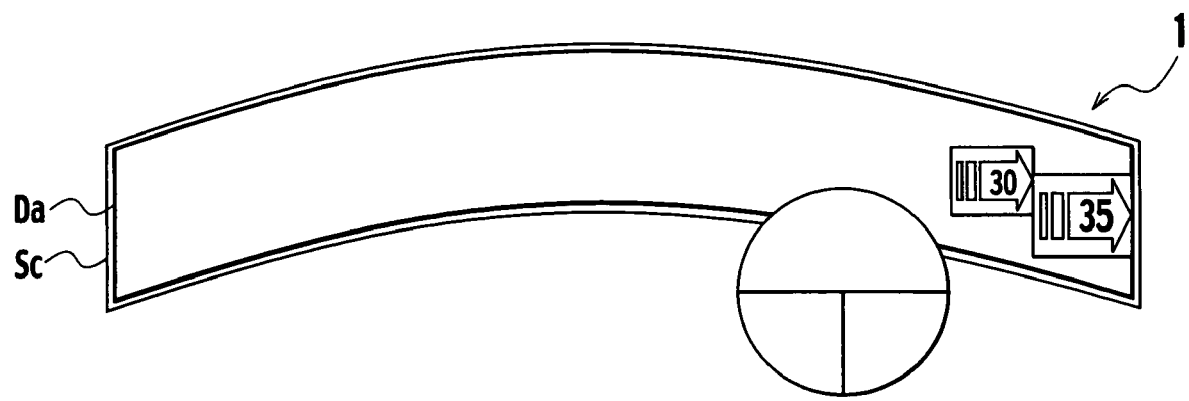

More particularly, in an example shown in FIG. 23, under circumstances where point information to be displayed, include point information related to the point P1, and point information related to the point P2, respectively, the point P2 lies on the left side with respect to the velocity vector of the host vehicle A passing the point P1 closest to the current location G of the host vehicle. Thus, as shown in FIG. 23B, the display control unit 5 allows point information related to the point P1, to be displayed in an area close proximity to a right side of the display area Da on the screen Sc of the display device 1 and point information related to the point P2, to be displayed in an area adjacent to a left side of point information related to the point P1.

Figure 24:
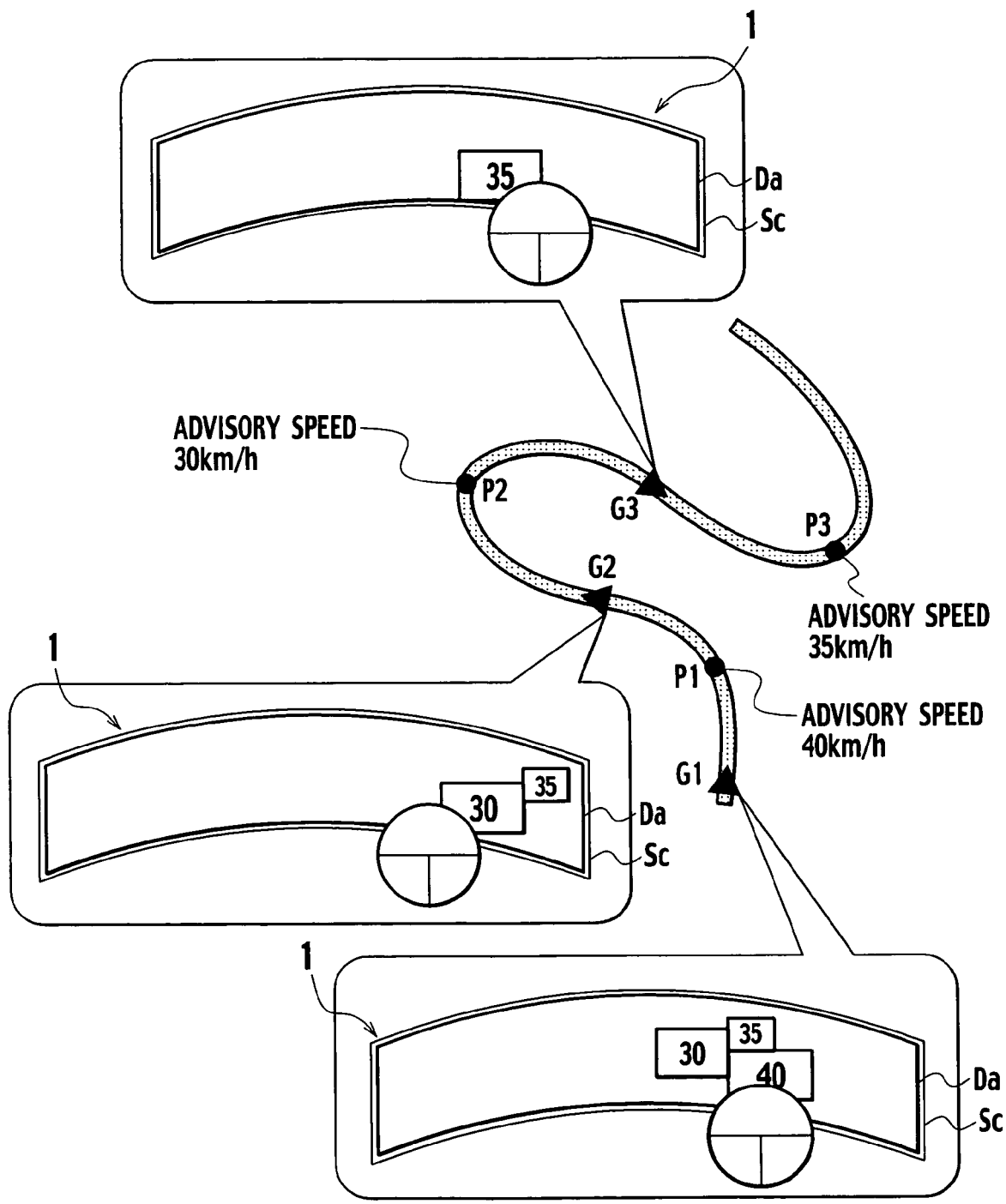
FIG. 24 shows how the respective point information are displayed in a mode where a positional relationship relative to an immediately preceding point in compliance with variation in location of the vehicle is shown in an easy-to-understand way.

With the driving support system SS4, the series of operation set forth above are repeatedly executed for a given cycle. This results in a capability for the display area Da on the screen Sc of the display device 1 to be provided with information of various point information on the route of the host vehicle A in a display mode, as shown in FIG. 24, which enables the driver to intuitively and quickly recognize the positional relationship relative to the immediately preceding point of the host vehicle A, in compliance with variation in the position of the host vehicle A. That is, in an example shown in FIG. 24, when the host vehicle A is running on a position at a point G1, point information related to the respective points P1, P2, P3 are displayed in the display area Da on the screen Sc of the display device 1 such that point information related to the point P2, lies on the left side adjacent to point information related to the point P1, and point information related to the point P3, lie on the right side adjacent to point information related to the point P2. When the host vehicle A is running on a position at a point G2, point information related to the points P2, P3, are displayed in the display area Da in the screen Sc of the display device 1, respectively, such that point information related to the point P3, lies on the right side adjacent to point information related to the point P2, and during a period wherein the host vehicle A is running on the position at the point G2, point information related to the point P3 is displayed in the screen Sc of the display device 1 at a display position associated with a direction in which the point P3 from the current location of the host vehicle A is present.

As set forth above, the driving support system SS4 is configured such that in cases where there are plural point information to be displayed, the operation is executed to determine the display positions of point information related to the points other than the point closest in distance to the current location of the host vehicle, based on the relative positional relationship relative to the points on the side nearer to the current location of the host vehicle than the relevant point. Therefore, the respective point information can be displayed in a manner to enable the driver to intuitively and quickly recognize the direction in which the point actually appears after the host vehicle A passes the point immediately preceding the relevant point, thereby making it possible to appropriately supporting the driving operation of the driver.

The preferred embodiments described herein are illustrative and not restrictive, and the invention may be practiced or embodied in other ways without departing from the spirit or essential character thereof.

The scope of the invention being indicated by the claims, and all variations which come within the meaning of claims are intended to be embraced herein.

The present disclosure relates to subject matters contained in Japanese Patent Application No. 2004-173937, filed on Jun. 11, 2004, and Japanese Patent Application No. 2005-113418, filed on Apr. 11, 2005, the disclosures of which are expressly incorporated herein by reference in their entirety.

What is claimed is:

1. A driving support system comprising:
   a vehicle location detector which detects a current location of and a velocity vector of a vehicle;
   a traffic and road information database which stores at least point information related to points on a route of the vehicle;
   a point information acquisition unit which acquires, from the traffic and road information database, the point information of the points on the route of the vehicle, which are located in a given distance from the current location of the vehicle and to which the vehicle is approaching, based on the current location and velocity vector of the vehicle detected by the vehicle location detector;
   a display device having a horizontally long screen in a lower area of a driver's view during driving when looking ahead through a windshield of the vehicle; and
   a display control unit for the display device operative to determine display positions on the screen of the display device based on a positional relationship between the current location of the vehicle and the points point information are to be displayed and to display the acquired point information on the screen at the determined display positions.

2. The driving support system according to claim 1, wherein
   each of the display positions is determined to be a position on the screen in the direction of an actual location of the point where the point information related thereto is displayed, from a driver's eye position in the vehicle.

3. The driving support system according to claim 2, wherein
   the display control unit is operative such that in cases where the direction of the actual location of the point where the point information related thereto is displayed is deviated from a range of a display area of the screen of the display device, the point information related thereto is displayed in a right end or a left end of the display area, while providing a display of information indicative of the deviation.

4. The driving support system according to claim 1, wherein
   the display control unit determines the display positions in a vertical direction of a display area of the screen of the display device, based on distances from the current location of the vehicle to the points where the point information related thereto are displayed.

5. The driving support system according to claim 1, wherein
   the display control unit determines image sizes of the point information to be displayed, based on distances from the current location of the vehicle to the points where the point information related thereto are displayed.

6. The driving support system according to claim 1, wherein
   the display control unit determines display colors of the point information to be displayed, depending on a priority of the point information.

7. The driving support system according to claim 6, wherein
   the display control unit calculates required decelerations at the points where the point information related thereto are displayed, and determines the priority of the point information depending on the calculated required decelerations.

8. The driving support system according to claim 1, wherein
   the point information includes information on advisory speeds when the vehicle passes the relevant points.

9. The driving support system according to claim 1, wherein
   the display control unit is operative such tat in cases where the point information related to a plurality of the points are acquired by the point information acquisition unit, the point information related to the plural points are simultaneously displayed on the screen of the display device.

10. The driving support system according to claim 9, wherein
the display control unit is operative such that in cases where discrimination is made that images of the point information of the plural points overlap on the screen of the display device, the point information related to the point closest to the current location of the vehicle is selected for display.

11. The driving support system according to claim 9, wherein
the display control unit is operative such that in cases where discrimination is made that images of the point information of the plural points overlap on the screen of the display device, the point information related to the point whose priority is the highest is selected for display.

12. The driving support system according to claim 9, wherein
the display control unit is operative such that in cases where discrimination is made that images of the point information of the plural points overlap on the screen of the display device, the point information are displayed in a manner that the point information to be displayed on the uppermost layer is alternately switched.

13. The driving support system according to claim 12, wherein
the display control unit determines a display time interval, for which the point information are displayed on the uppermost layer, based on distances from the current location of the vehicle to the respective points.

14. The driving support system according to claim 12, wherein
the display control unit determines a display time interval, for which the point information are displayed on the uppermost layer, based on priorities of the point information related to the respective points.

15. The driving support system according to claim 9, wherein
the display control unit is operative such that the display positions of the point information related to the points except for the point in the shortest distance from the current location of the vehicle are determined based on a relative positional relationship with one of the points which is in a shorter distance from the current location of the vehicle.

16. The driving support system according to claim 1, further comprising:
a vehicle information acquisition unit acquiring vehicle information indicative of behavior of the vehicle,
wherein the display control unit changes an updating cycle of the display of the display device based on the vehicle information acquired by the vehicle information acquisition unit.

17. The driving support system according to claim 16, wherein
the vehicle information acquisition unit acquires a steering speed of the vehicle,
wherein the display control unit updates the display of the display device during a period in which the steering speed is less than a given value, and interrupts the updating of the display of the display device when the steering speed exceeds the given value.

18. A driving support system comprising:
a vehicle location detector which detects a current location of and a velocity vector of a vehicle;
a traffic and road information database which stores at least point information related to points on a route of the vehicle;
a point information acquisition unit which acquires, from the traffic and road information database, the point information of the points on the route of the vehicle, which are located in a given distance from the current location of the vehicle and to which the vehicle is approaching, based on the current location and velocity vector of the vehicle detected by the vehicle location detector;
a display device having a horizontally long screen in a lower area of a driver's view during driving when looking ahead through a windshield of the vehicle; and
a display control unit for the display device, operative to determine display positions on the screen of the display device based on a positional relationship between the current location of the vehicle and the points whose point information are displayed, to determine image sizes of the point information to be displayed based on distances from the current location of the vehicle to the points whose point information are to be displayed and to display the acquired point information on the screen at the determined display positions with the determined image sizes.

19. A driving support method for providing a driver with information related to points on a route, comprising:
detecting a current location and a velocity vector of a vehicle;
acquiring point information related to points on a route of the vehicle, which are located in a given distance from a current location of the vehicle and to which the vehicle is approaching, based on the detected current location and velocity vector of the vehicle;
providing a screen of a display device in a lower area of a driver's view during driving;
determining display positions of the acquired point information on the screen based on a positional relationship between the detected current position of the vehicle and the points whose point information are to be displayed;
determining image sizes of the acquired point information to be displayed based on distances front the detect4ed current location of the vehicle to the points whose point information are to be displayed; and
displaying the acquired point information on the screen at the determined display positions with the determined image sizes.

* * * * *